(12) United States Patent
Watanabe et al.

(10) Patent No.: US 7,979,391 B2
(45) Date of Patent: Jul. 12, 2011

(54) DATA MANAGEMENT SYSTEM, DATA MANAGEMENT METHOD, SERVER APPARATUS, RECEIVING APPARATUS, CONTROL PROGRAM, AND COMPUTER-READABLE RECORDING MEDIUM RECORDING SAME

(75) Inventors: Shuichi Watanabe, Chiba (JP); Jiro Kiyama, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1117 days.

(21) Appl. No.: 11/666,071

(22) PCT Filed: Feb. 14, 2006

(86) PCT No.: PCT/JP2006/002559
§ 371 (c)(1),
(2), (4) Date: Apr. 20, 2007

(87) PCT Pub. No.: WO2006/090612
PCT Pub. Date: Aug. 31, 2006

(65) Prior Publication Data
US 2008/0091687 A1 Apr. 17, 2008

(30) Foreign Application Priority Data
Feb. 25, 2005 (JP) .................................. 2005-050105
Apr. 8, 2005 (JP) .................................. 2005-111567

(51) Int. Cl.
*G06F 7/00* (2006.01)
*G06F 17/00* (2006.01)
*G06F 15/16* (2006.01)
*G11B 21/08* (2006.01)

(52) U.S. Cl. ................ 707/620; 707/999.01; 707/999.2; 707/999.004; 707/999.008; 707/999.101; 709/203; 369/30.01

(58) Field of Classification Search .................. 707/620; 709/203; 369/30.01
See application file for complete search history.

(56) References Cited

U.S. PATENT DOCUMENTS
5,870,759 A * 2/1999 Bauer et al. .................... 707/201
(Continued)

FOREIGN PATENT DOCUMENTS
JP 2002-056651 2/2002
(Continued)

OTHER PUBLICATIONS
Zhu, 'A Role-Based Conflict Resolution Method for a Collaborative System', 2003 IEEE, pp. 4135-4140.*
(Continued)

*Primary Examiner* — Wilson Lee
*Assistant Examiner* — Cheryl M Shechtman
(74) *Attorney, Agent, or Firm* — David G. Conlin; Steven M. Jensen; Edwards Angell Palmer & Dodge LLP

(57) ABSTRACT

A server apparatus (1) includes a deletion information decision section (104) and a management information update section (105). The deletion information decision section (104) decides a file from among files of an AV content already stored in a storage section (202) of a receiving apparatus (2), the file to be decided being so deleted as to be prevented from being used in the receiving apparatus (2) when files constituting an AV content that is to be newly transmitted is stored in the storage section (202). The management information update section (105) transmits, to the receiving apparatus (2), management information including deletion information for specifying the file thus decided. The receiving apparatus (2) includes a deletion section (205) for deleting, from the storage section (202), the file specified by the deletion information of the management information received from the server apparatus (1).

17 Claims, 22 Drawing Sheets

U.S. PATENT DOCUMENTS

| | | | |
|---|---|---|---|
| 7,209,934 B2 * | 4/2007 | Atchison | 707/205 |
| 7,529,780 B1 * | 5/2009 | Braginsky et al. | 707/203 |
| 2002/0032728 A1 | 3/2002 | Sako et al. | |
| 2002/0135608 A1 | 9/2002 | Hamada et al. | |
| 2002/0174180 A1 | 11/2002 | Brown et al. | |
| 2004/0158817 A1 | 8/2004 | Okachi et al. | |
| 2004/0220926 A1 | 11/2004 | Lamkin et al. | |
| 2006/0106879 A1 * | 5/2006 | Zondervan et al. | 707/200 |
| 2006/0256669 A1 * | 11/2006 | Sakuma et al. | 369/30.01 |
| 2007/0136314 A1 * | 6/2007 | Bae et al. | 707/10 |

FOREIGN PATENT DOCUMENTS

| | | |
|---|---|---|
| WO | WO-02/075525 | 9/2002 |

OTHER PUBLICATIONS

Sinitsyn, 'A Synchronization Framework for Personal Mobile Servers', 2004 Proceedings of Second IEEE Annual Conference on Pervasive Computing and Communications Workshops, pp. 1-5.*

Sinitsyn, Alexander, "A Synchronization Framework for Personal Mobile Servers," Proceedings of the Second IEEE Annual Conference on Pervasive Computing and Communications Workshops, 2004, pp. 1-5.

Ramsey, Norman et al., "An Algebraic Approach to File Synchronization," Software Engineering Notes, 2001, pp. 175-185.

"SyncML Sync Protocol, version 1.0," SYNCML Consortium, Dec. 7, 2000, pp. 1-60.

* cited by examiner

FIG. 4
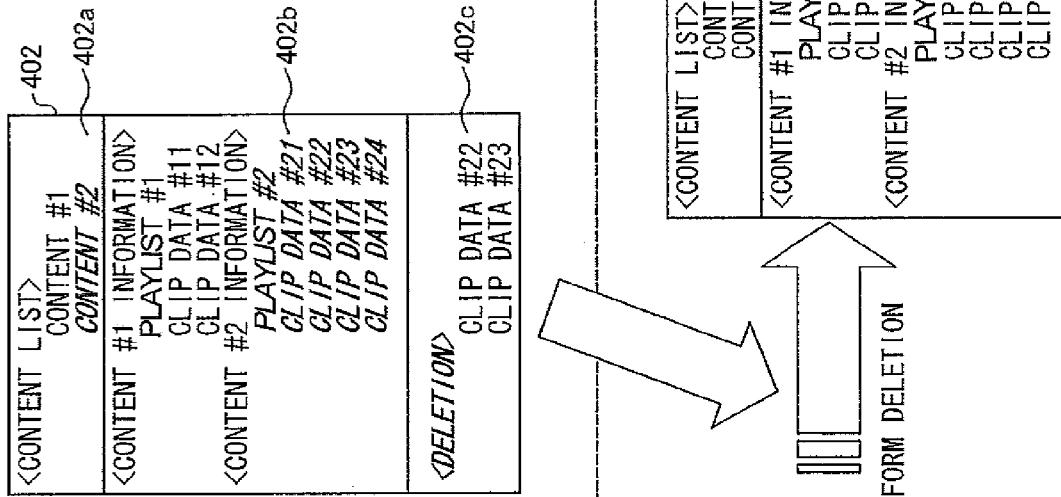
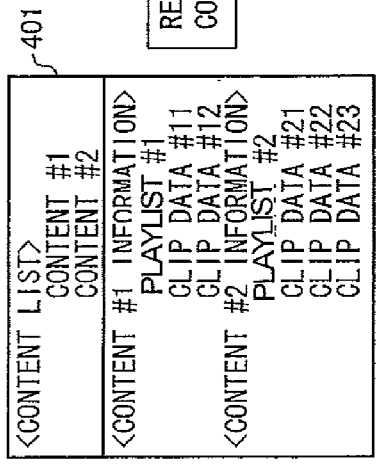
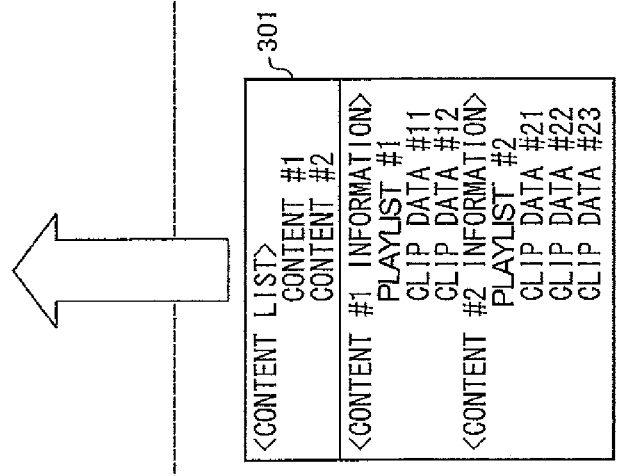

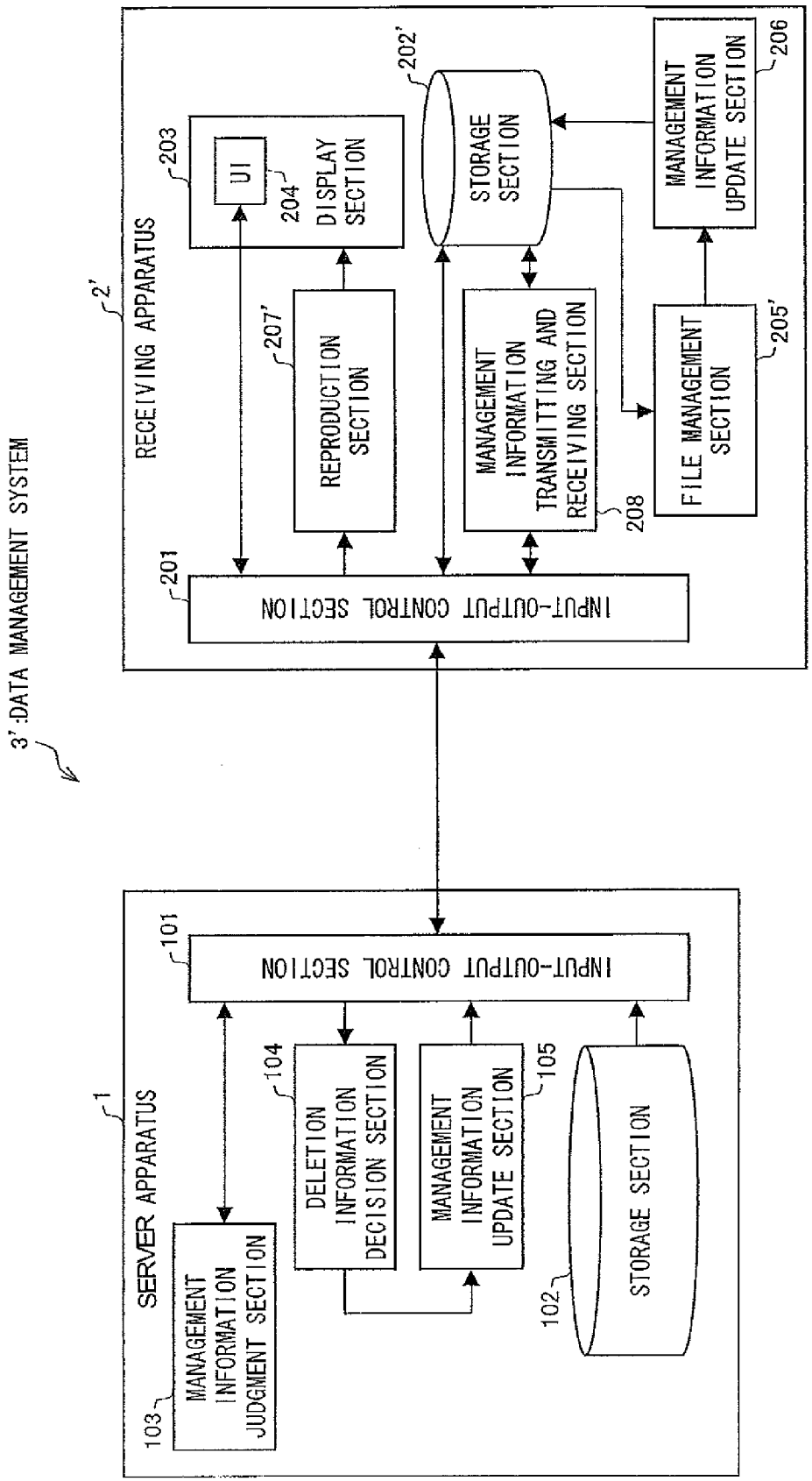
F I G. 7

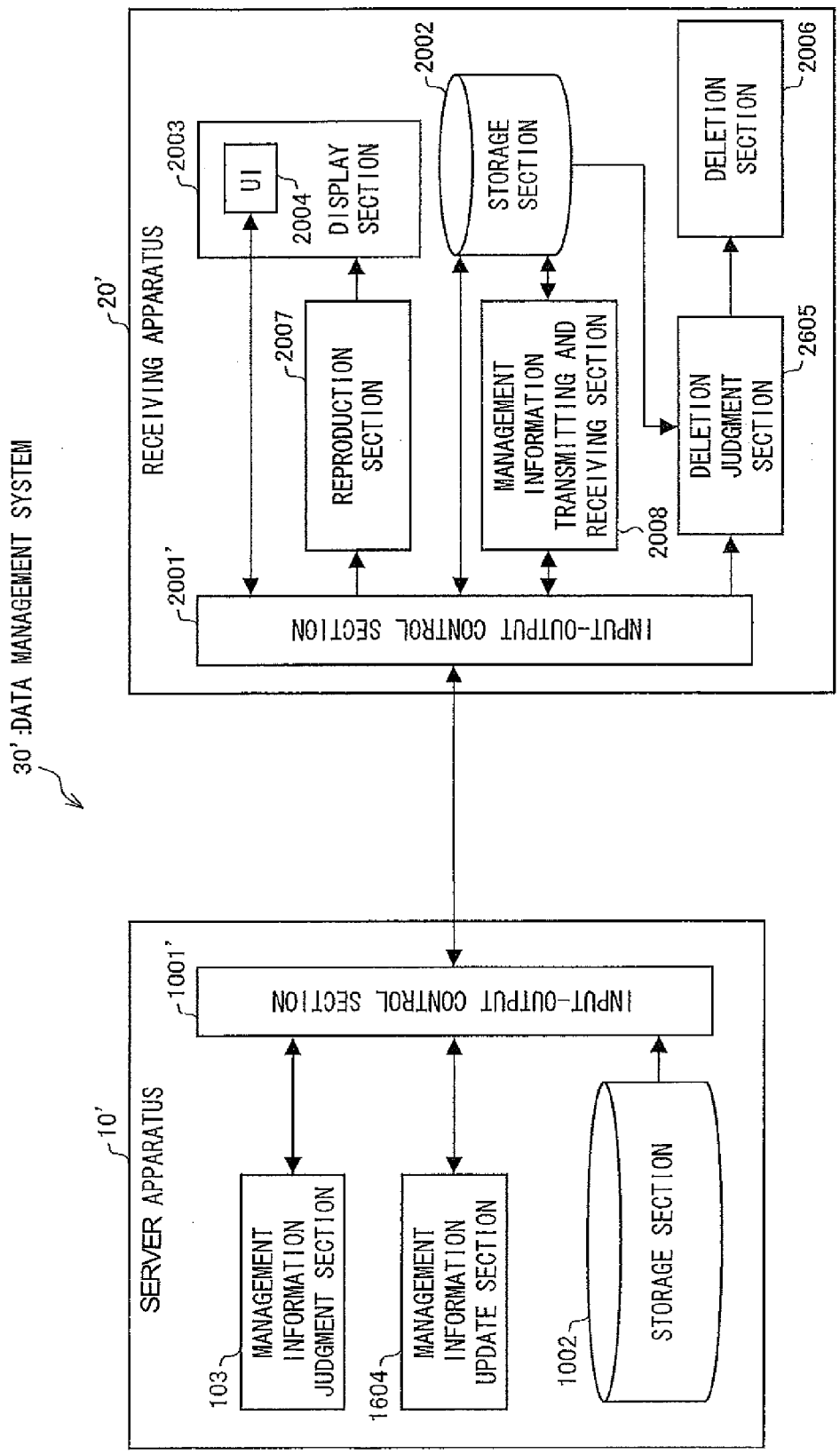
F I G. 16

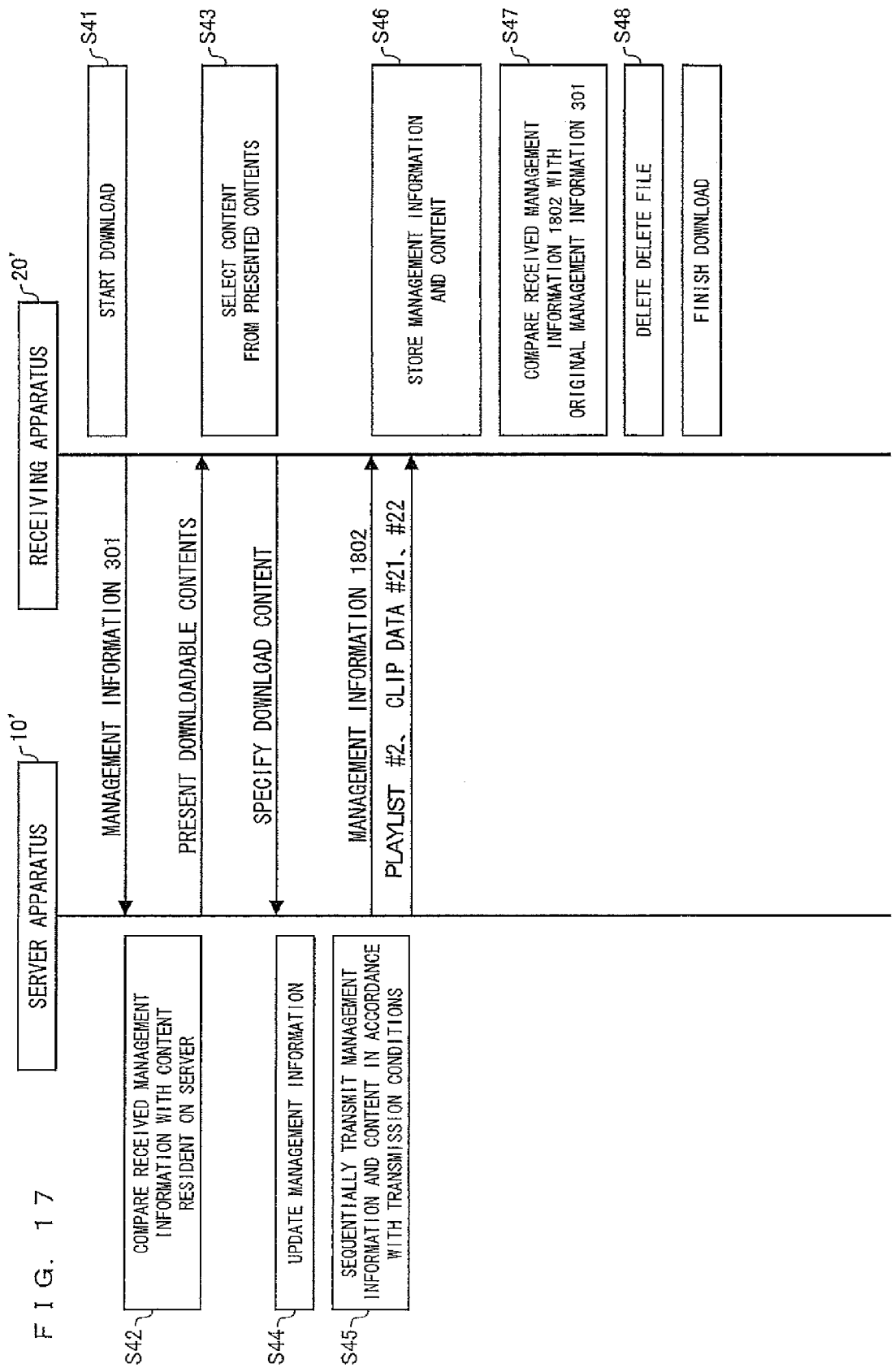

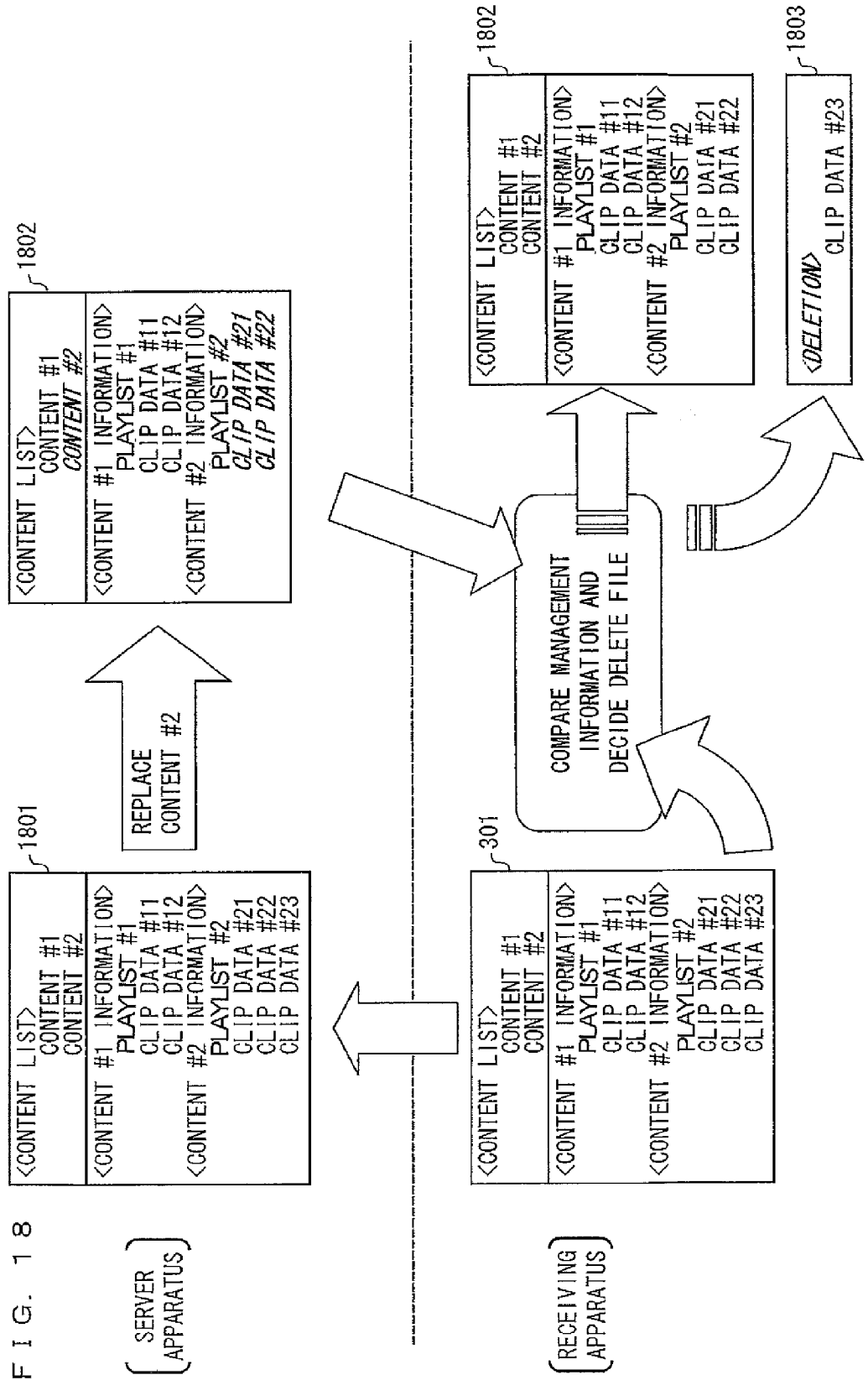

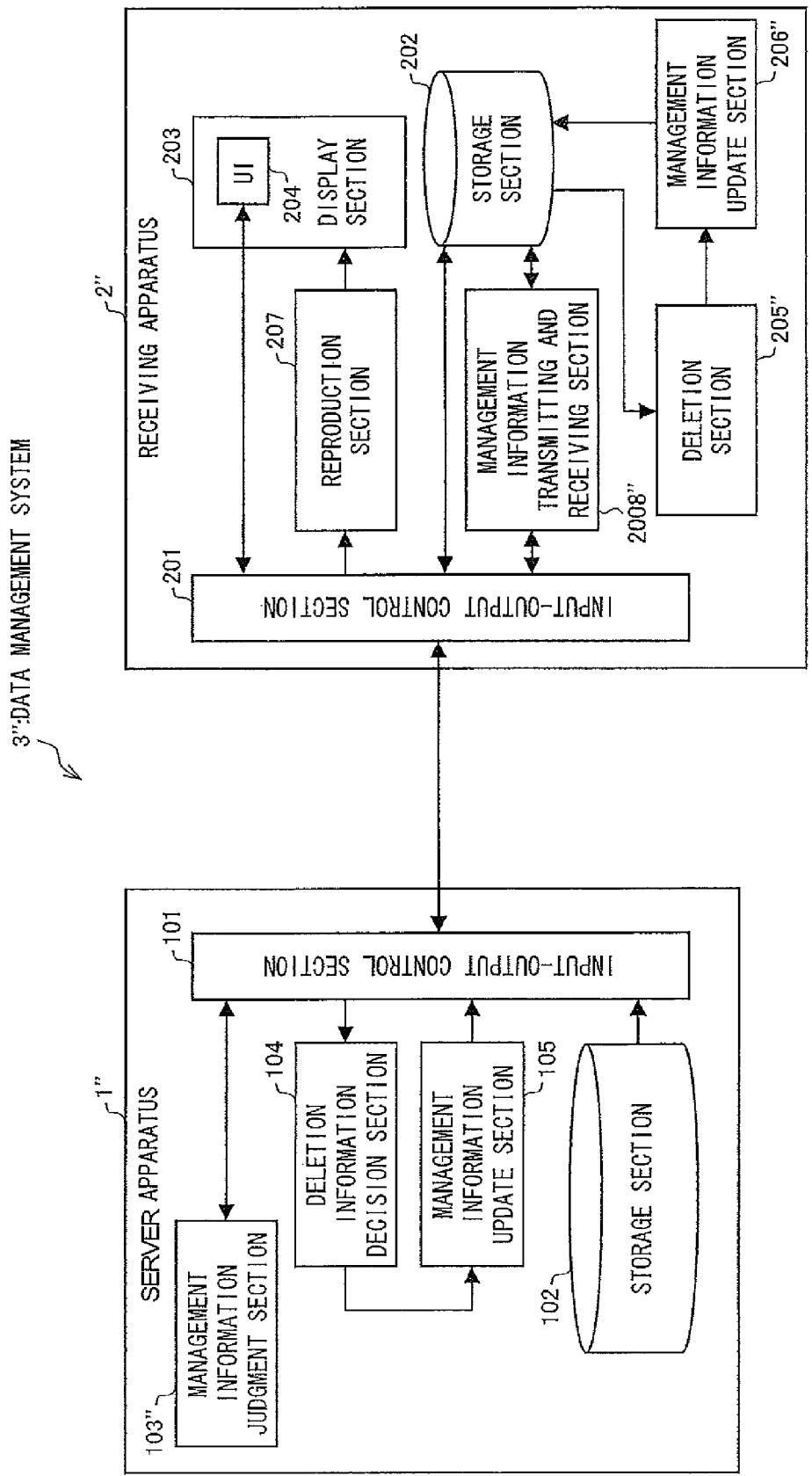

F I G. 2 0
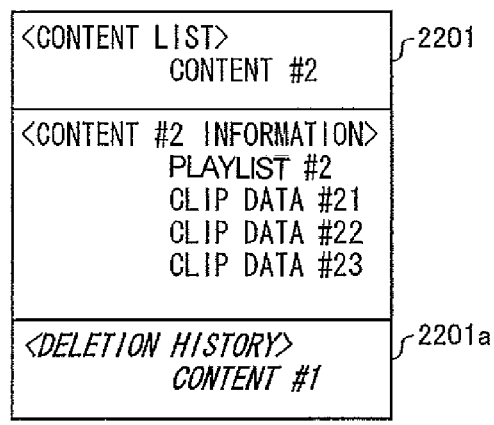

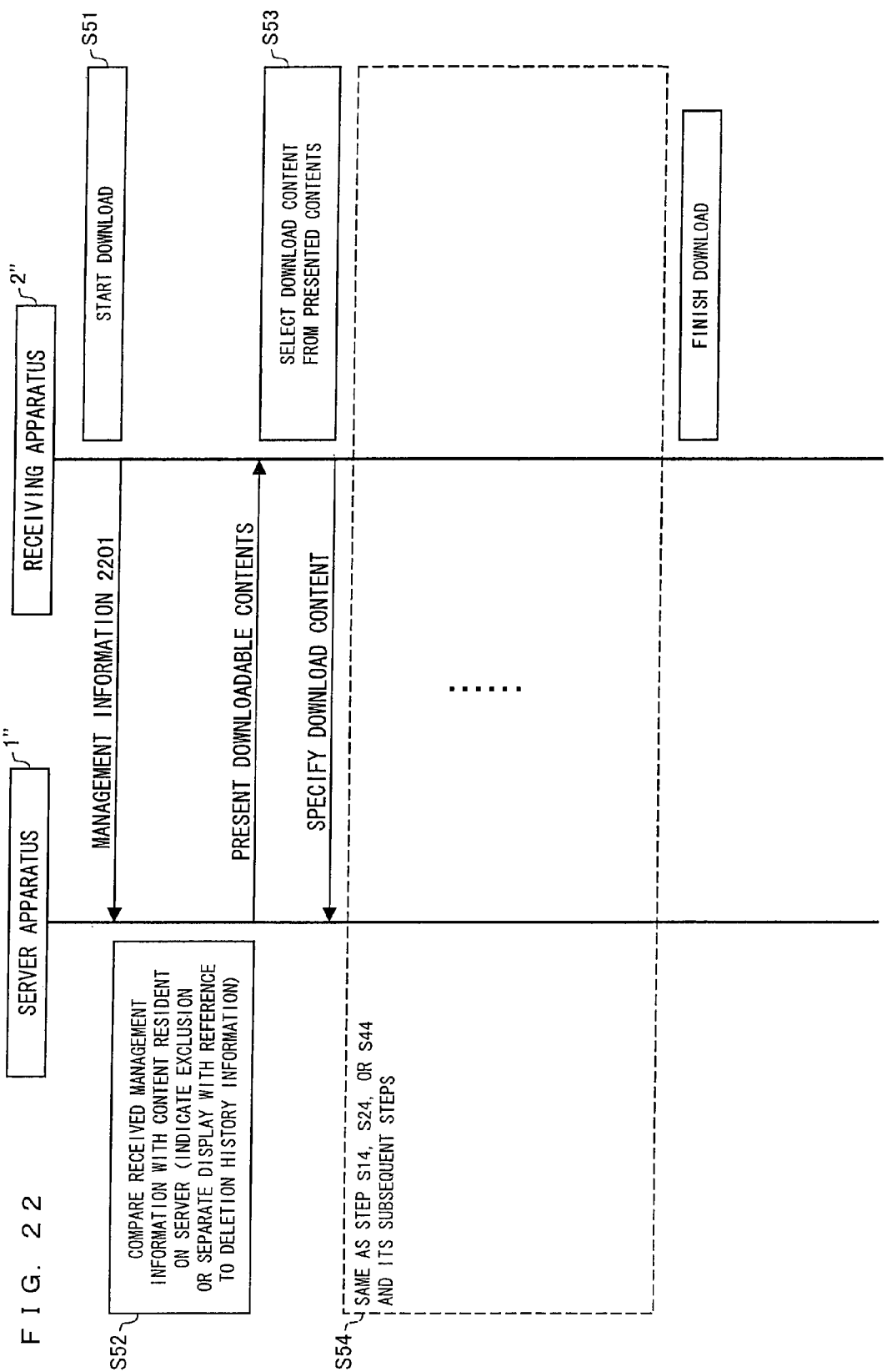

US 7,979,391 B2

DATA MANAGEMENT SYSTEM, DATA MANAGEMENT METHOD, SERVER APPARATUS, RECEIVING APPARATUS, CONTROL PROGRAM, AND COMPUTER-READABLE RECORDING MEDIUM RECORDING SAME

TECHNICAL FIELD

The present invention relates to (i) a data management system including (a) a server apparatus having a function of storing a plurality of data files and of appropriately delivering the plurality of data files to a receiving apparatus and (b) a receiving apparatus having a function of receiving a data file from the server apparatus and of storing the data file, (ii) a server apparatus and a receiving apparatus together constituting the data management system, (iii) a data management method, (iv) a control program, and (v) a computer-readable recording medium in which the control program is recorded.

BACKGROUND ART

Such a data service has been widely provided that servers and clients linked to one another via a network communicate with one another and that contents stored in server apparatuses are download into client terminals (receiving apparatuses) and used. Especially, because of the current widespread use of broadband networks, such a mechanism is being put into place that even a content having a large capacity of transmission (e.g., a digital video image) is processed. According to this mechanism, a plurality of AV contents are stored in a server, are downloaded or streamed at a client's request, and are reproduced at a client terminal.

FIG. 14 is a diagram schematically showing a conventional video delivery system 1300 in which a server apparatus 1301 is linked to receiving apparatuses 1302 via a network and in which the server apparatus 1301 delivers an AV content to each of the receiving apparatuses 1302. This is a so-called networked video-on-demand system. Further, there have been increasingly various kinds of similar system and service that do not use a network. Examples of such a system and service include a server-type broadcasting system and service. According to the server-type broadcasting system and service, a content stored in a receiving apparatus by using a broadcast wave is viewed.

FIG. 15 shows an embodiment of the AV content to be treated in the video delivery system 1300. The AV content includes a playlist and clip data. Note that FIG. 15 is also an explanatory diagram of the present invention.

The AV content shown in FIG. 15 includes (i) a plurality of files (clip data 1402) containing actual data such as video images and sounds and (ii) a file (playlist 1401) indicating a reproduction procedure in which the actual data are reproduced (as well as places where the actual data are reproduced). That is, the playlist 1401 and the plurality of clip data 1402 are collectively treated as the single AV content 1400. How the playlist 1401, the clip data 1402, and the AV content 1400 constituted thereby are treated is fully described in Japanese Unexamined Patent Application No. 56651/2002 (Tokukai 2002-56651; published on Feb. 22, 2002).

Generally, in the video delivery system 1300, a plurality (large number) of receiving apparatuses 1302 are connected to a single server apparatus 1301.

Moreover, in the video delivery system 1300, when the AV content 1400 is allowed to be downloaded into the receiving apparatuses 1302 in different procedures, it becomes difficult to manage which files (clip data 1402) resident on the server apparatus 1301 can be respectively downloaded next into the receiving apparatuses 1302. Examples of a file that can be downloaded by a receiving apparatus 1302 include (i) a file yet to be acquired by the receiving apparatus 1302 and (ii) a file which has already been downloaded by the receiving apparatus 1302 and which needs rewrites to match new content. Therefore, in order to find a downloadable file, it is necessary to find (files constituting) an AV content already acquired by the receiving apparatus 1302.

Especially, in cases where an update is performed by sequentially downloading the constituent files, i.e., the clip data 1402 of the AV content 1400, an instruction to reproduce the playlist 1401 referring to the clip data 1402 may be given when new clip data 1402 have not been downloaded (are being downloaded) or when the clip data have failed to be completely downloaded. This causes such a problem that reproduction different from that originally expected is performed by referring to another file that was downloaded in the past.

The present invention has been made in view of the foregoing problems, and it is an object of the present invention to provide (i) a data management system in which a server apparatus stores a plurality of data files and appropriately delivers the plurality of data files to a receiving apparatus and in which data management can be effectively preformed in the receiving apparatus, (ii) a server apparatus and a receiving apparatus together constituting the data management system, (iii) a data management method, (iv) a control program, and (v) a computer-readable recording medium in which the control program is recorded.

DISCLOSURE OF INVENTION

In order to attain the foregoing object, a data management system of the present invention is a data management system, including: at least one receiving apparatus; and at least one server apparatus for transmitting, to the receiving apparatus, a file group including a plurality of data files, the receiving apparatus including a storage section for storing the plurality of data files, the server apparatus including: a deletion information decision section (file decision means) for deciding a data file from among first data files which have been already stored in the storage section, the data file to be decided being restricted or prohibited from being used in the receiving apparatus when second data files constituting a file group that is to be newly transmitted to the receiving apparatus are stored in the storage section; and a management information update section (management information transmitting means) for transmitting, to the receiving apparatus, file specifying information for specifying the data file decided by the deletion information decision section, the receiving apparatus receiving the file group constituted by the second data files, the receiving apparatus, further including: a deletion section (file management means) for restricting use of or deleting, in accordance with the file specifying information received from the server apparatus, the data file already stored in the storage section.

Further, a data management method of the present invention is a data management method for managing data in a data management system including at least one receiving apparatus and at least one server apparatus for transmitting, to the receiving apparatus, a file group including a plurality of data files, the data management method, including: a file decision step of causing the server apparatus to decide a data file from among first data files which have been already stored in a storage section of the receiving apparatus, the data file to be decided being restricted or prohibited from being used in the receiving apparatus when second data files constituting a file group that is to be newly transmitted to the receiving apparatus are stored in the storage section; a management information transmitting step of causing the server apparatus to transmit, to the receiving apparatus, file specifying information for specifying the data file thus decided, the receiving apparatus receiving the file group constituted by the second data files; and a file management step of causing the receiving apparatus to restrict use of or delete, in accordance with the file specifying information received from the server apparatus, the data file already stored in the storage section.

Further, a server apparatus of the present invention is a server apparatus for transmitting, to at least one receiving apparatus, a file group including a plurality of data files, the server apparatus, including: a deletion information decision section (file decision means) for deciding a data file from among first data files which have been already stored in a storage section of the receiving apparatus, the data file to be decided being restricted or prohibited from being used in the receiving apparatus when second data files constituting a file group that is to be newly transmitted to the receiving apparatus are stored in the storage section; a management information update section (management information transmitting means) for transmitting, to the receiving apparatus, file specifying information for specifying the data file decided by the deletion information decision section, the receiving apparatus receiving the file group constituted by the second data files.

Further, a receiving apparatus of the present invention is a receiving apparatus for receiving, from at least one server apparatus, a file group including a plurality of data files, the receiving apparatus, including: a storage section for storing the plurality of data files; and a deletion section (file management means) for restricting use of or deleting a data file which has already been stored in the storage section and which is specified by file specifying information received from the server apparatus.

According to the foregoing arrangement, when a server apparatus transmits, to a receiving apparatus in which a file group including first data files has been already stored in a storage section thereof, a new file group including second data files, the server apparatus transmits, to the receiving apparatus, file specifying information specifying a first data file which is to be prohibited or restricted from being used in the receiving apparatus. Moreover, in accordance with the file specifying information received from the server apparatus, the receiving apparatus restricts use of or deletes the first data file already stored in the storage section.

With this, when a new version of a file group is downloaded into a receiving apparatus in which an older version of the file group is stored, a data file which constitutes the older version of the file group and which is replaced by a data file constituting the new version of the file group can be deleted for example. Therefore, the data file which constitutes the older version of the file group can be prevented from being wrongly used.

For example, in cases where constituent files, i.e., clip data of an AV content are sequentially downloaded and stored, an instruction to reproduce a playlist referring to the clip data may be given when new clip data have not been downloaded (are being downloaded) or when the clip data have failed to be completely downloaded. Even in this case, reproduction different from that originally expected is prevented from being performed by referring to another file that was downloaded in the past.

As described above, according to the foregoing arrangement, in a data management system in which a server apparatus storing a plurality of data files appropriately delivers the plurality of data files to a receiving apparatus, data management in the receiving apparatus can be effectively performed.

Further, a data management system of the present invention is a data management system, including: at least one receiving apparatus; and at least one server apparatus for transmitting, to the receiving apparatus, a file group including a plurality of data files, the receiving apparatus including a storage section for storing the plurality of data files, the server apparatus including a difference management information generation section (management information transmitting means) for transmitting, to the receiving apparatus, management information specifying second data files constituting a file group that is to be newly transmitted to the receiving apparatus, the receiving apparatus receiving the file group, the receiving apparatus, further including: a management information judgment and update section (file decision means) for deciding, in accordance with the management information received from the server apparatus, a data file from among first data files which have been already stored in the storage section, the data file to be decided being restricted or prohibited from being used in the receiving apparatus when the second data files constituting the file group that is to be newly received from the server apparatus are stored in the storage section; and a deletion section (file management means) for restricting use of the data file decided by the management information judgment and update section, or for deleting the data file from the storage section.

Further, a data management method of the present invention is a data management method for managing data in a data management system including at least one receiving apparatus and at least one server apparatus for transmitting, to the receiving apparatus, a file group including a plurality of data files, the data management method, including: a management information transmitting step of causing the server apparatus to transmit, to the receiving apparatus, management information specifying second data files constituting a file group that is to be newly transmitted to the receiving apparatus, the receiving apparatus receiving the file group; a file decision step of causing the receiving apparatus to decide, in accordance with the management information received from the server apparatus, a data file from among first data files which have been already stored in a storage section of the receiving apparatus, the data file to be decided being restricted or prohibited from being used in the receiving apparatus when the second data files constituting the file group that is to be newly received from the receiving apparatus are stored in the storage section; and a file management step of causing the receiving apparatus to restrict use of the data file thus decided, or to delete the data file from the storage section.

Further, a server apparatus of the present invention is a server apparatus for transmitting, to at least one receiving apparatus, a file group including a plurality of data files, the server apparatus, including: a difference management information generation section (management information transmitting means) for transmitting, to the receiving apparatus, management information specifying second data files constituting a file group that is to be newly transmitted to the receiving apparatus, the receiving apparatus receiving the file group.

Further, a receiving apparatus of the present invention is a receiving apparatus for receiving, from at least one server apparatus, a file group including a plurality of data files, the receiving apparatus, including: a storage section for storing the plurality of data files; a management information judgment and update section (file decision means) for (i) receiving, from the server apparatus, management information specifying second data files constituting a file group that is to be newly received from the server apparatus, and for (ii) deciding, in accordance with the management information, a data file from among first data files which have been already stored in the storage section, the data file to be decided being restricted or prohibited from being used in the receiving apparatus when the second data files are stored in the storage section; and a deletion section (file management means) for restricting use of the data file decided by the management information judgment and update section, or for deleting the data file from the storage section.

According to the foregoing arrangement, when a server apparatus transmits, to a receiving apparatus in which a file group including first data files has been already stored in a storage section thereof, a new file group including second data files, the server apparatus transmits management information specifying a second data file that is to be newly transmitted to the receiving apparatus. Then, in accordance with the management information received from the server apparatus, the receiving apparatus decides a first data file from among the first data files already stored in the storage section, the first data file to be decided being restricted or prohibited from being used in the receiving apparatus. Moreover, the receiving apparatus restricts use of or deletes the first data file.

With this, when a new version of a file group is downloaded into a receiving apparatus in which an older version of the file group is stored, a data file which constitutes the older version of the file group and which is replaced by a data file constituting the new version of the file group can be deleted for example. Therefore, the data file which constitutes the older version of the file group can be prevented from being wrongly used.

For example, in cases where constituent files, i.e., clip data of an AV content are sequentially downloaded and stored, an instruction to reproduce a playlist referring to the clip data may be given when new clip data have not been downloaded (are being downloaded) or when the clip data have failed to be completely downloaded. Even in this case, reproduction different from that originally expected is prevented from being performed by referring to another file that was downloaded in the past.

As described above, according to the foregoing arrangement, in a data management system in which a server apparatus storing a plurality of data files appropriately delivers the plurality of data files to a receiving apparatus, data management in the receiving apparatus can be effectively performed.

Note that each of the server apparatus and the receiving apparatus may be realized by a computer. In this case, (i) a control program for realizing each of the server apparatus and the receiving apparatus by a computer by operating the computer as each of the means and (ii) a computer-readable recording medium in which the control program is recorded are also encompassed in the scope of the present invention.

Additional objects, features, and strengths of the present invention will be made clear by the description below. Further, the advantages of the present invention will be evident from the following explanation in reference to the drawings.

BRIEF DESCRIPTION OF DRAWINGS

FIG. 4 is an explanatory diagram showing how the management information is updated in accordance with the process flow of the example of operation shown in FIG. 3.

FIG. 7 is a functional block diagram showing a structure of a data management system according to another embodiment of the present invention.

FIG. 16 is a functional block diagram showing a structure of a data management system according to another embodiment of the present invention.

FIG. 17 is a process flow diagram showing an example of operation of the data management system shown in FIG. 16.

FIG. 18 is an explanatory diagram showing how the management information is updated in accordance with the process flow of the example of operation shown in FIG. 17.

FIG. 19 is a functional block diagram showing a structure of a data management system according to another embodiment of the present invention.

FIG. 20 is an explanatory diagram showing an example of a data structure of management information for use in the data management system shown in FIG. 19.

FIG. 22 is a process flow diagram showing an example of operation of the data management system shown in FIG. 19.

BEST MODE FOR CARRYING OUT THE INVENTION

Embodiment 1

An embodiment of the present invention will be described below with reference to FIGS. 1 through 6 and FIG. 15.

Figure 1:
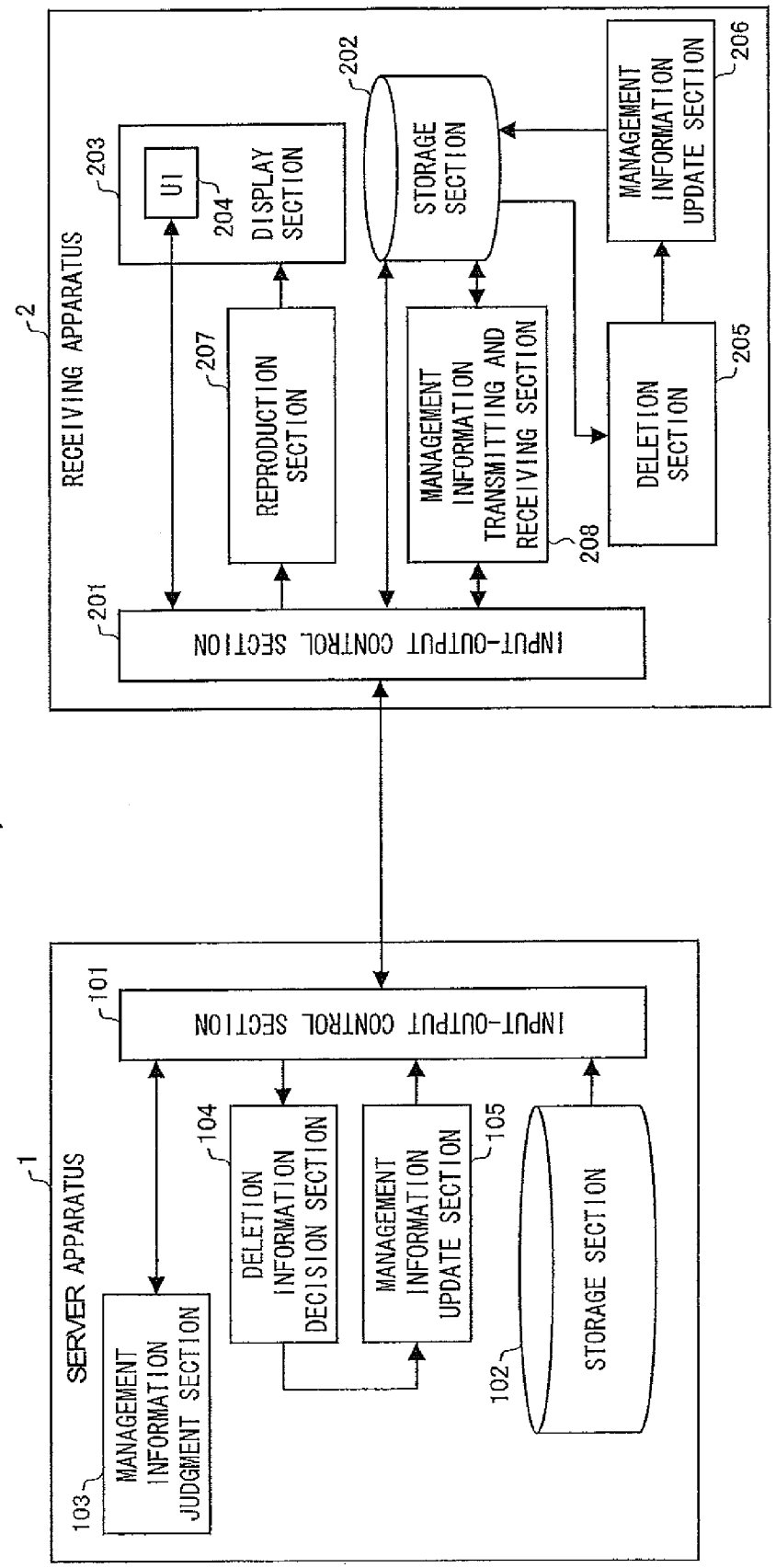
FIG. 1 a functional block diagram showing a structure of a data management system according to an embodiment of the present invention.

FIG. 1 is a functional block diagram showing a data management system 3 according to Embodiment 1 of the present invention.

The data management system 3 includes: a server apparatus 1, which stores and sends out a large number of AV contents; and a receiving apparatus 2, which receives, stores, and reproduces an AV content sent from the server apparatus 1.

The server apparatus 1 includes an input-output control section 101, a storage section 102, a management information judgment section 103, a delete information decision section 104, and a management information update section 105. Further, the receiving apparatus 2 includes an input-output control section 201, a storage section 202, a display section 203, a UI (user interface) 204 (included in the display section 203), a deletion section 205, a management information update section 206, a reproduction section 207, and a management information transmitting and receiving section 208.

In the data management system 3, the server apparatus 1 sends, to one or more receiving apparatuses 2, an AV content (file group) containing a plurality of data files (playlist, clip data). Moreover, in particular, the server apparatus 1 includes the deletion information decision section (file decision means) 104 and the management information update section (management information transmitting means) 105. The deletion information decision section 104 decides a (first) data file from among data files which have been already stored in the storage section 202 of the receiving apparatus 2, the (first) data file to be decided being so deleted as to be prevented from being used in the receiving apparatus 2 when (second) data files constituting an AV content that is to be newly transmitted are stored in the storage section 202. The management information update section 105 transmits, to the receiving apparatus 2, deletion information (file specifying information) for specifying the (first) data file thus decided, the receiving apparatus 2 being a destination of the AV content including the (second) data files.

Further, in the data management system 3, the receiving apparatus 2 receives, from one or more server apparatuses 1, an AV content (file group) including a plurality of data files (playlist, clip data), and stores the AV content in the storage section 202. Moreover, in particular, the receiving apparatus 2 includes the deletion section (file management means) 205 for deleting a (first) data file, already stored in the storage section 202, which is specified by deletion information contained in management information received from the server apparatuses 1.

The file so deleted from the storage section 202 as to be prevented from wrongly used does not need to be deleted. Instead, the file may be prohibited or restricted from being used.

The data management system 3 is arranged such that: when the receiving apparatus 2 is used to receive an AV content transmitted from the server apparatus 1, the content can be stored with the intention of the transmission being correctly retained. Specifically, the data management system 3 includes: (i) the deletion information decision section 104 for, when an AV content (playlist, clip data) is downloaded from the server apparatus 1 to the receiving apparatus 2 and then stored in the receiving apparatus 2, generating deletion information specifying a file, already stored in the receiving apparatus 2, which may be wrongly referred to; (ii) the update section 105 for incorporating the deletion information into management information; and (iii) the deletion section 205 for deleting the file before downloading. This makes it possible to perform management so that the receiving apparatus 2 is prevent from performing reproduction by using a wrong file.

In FIG. 1, the data management system 3 seems to be arranged so as to include a single server apparatus 1 and a single receiving apparatus 2. However, in practice, the data management system 3 may be arranged such that (i) a single server apparatus 1 is accessed by a plurality of receiving apparatuses 2 or (ii) a single receiving apparatus 2 is accessed by a plurality of server apparatuses 1.

Figure 15:
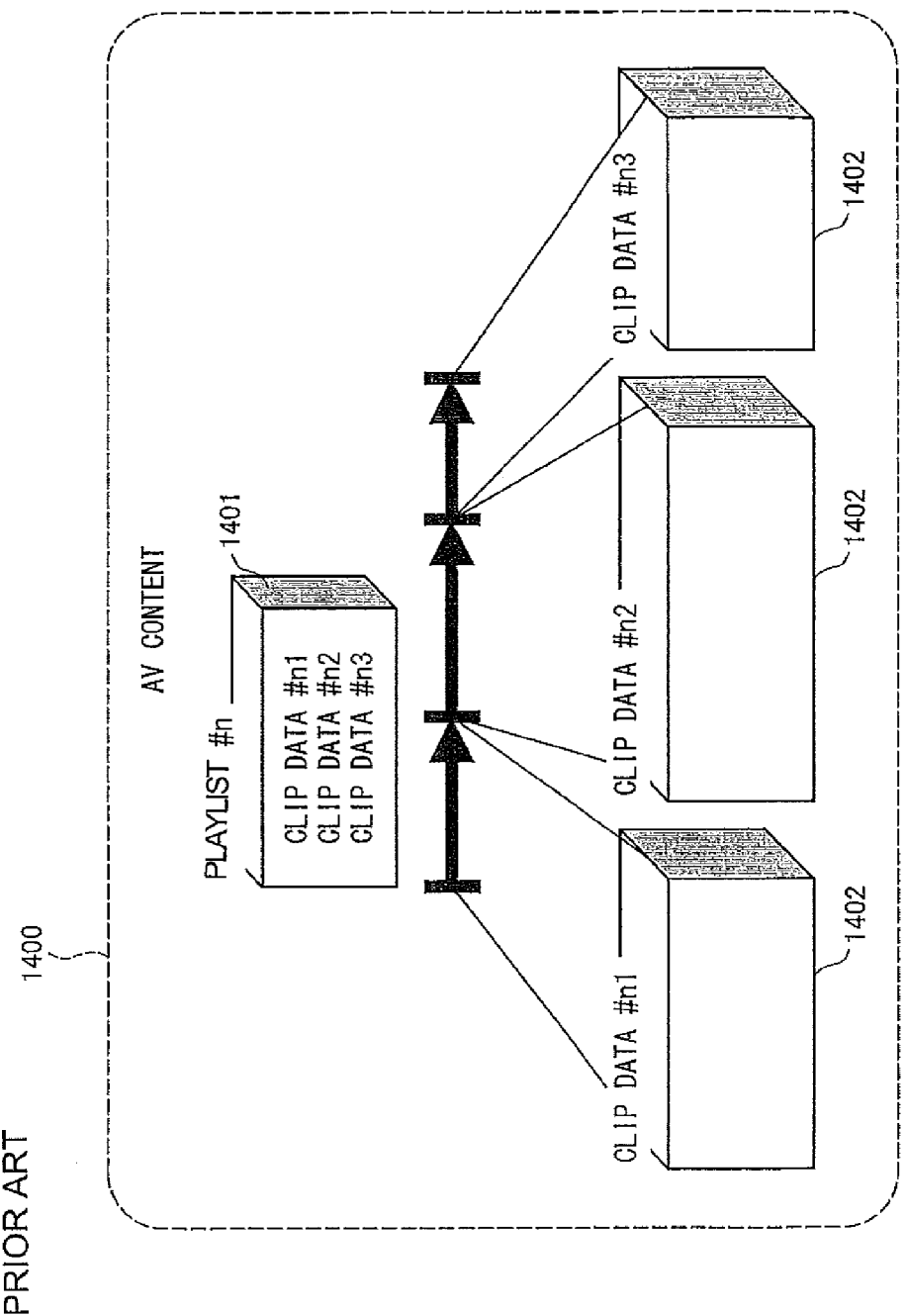
FIG. 15 is an explanatory diagram showing an example of how an AV content is structured.

It is assumed that the data management system 3 deals with an AV content 1400 shown in FIG. 15. The AV content 1400 includes (i) a plurality of clip data 1402 . . . containing actual data such as video images and sounds and (ii) a playlist 1401 indicating a reproduction procedure in which the actual data are reproduced. The reproduction procedure indicated by the playlist 1401 can contain (a) order information concerning an order in which the clip data 1402 are arranged as shown in the figure and (b) information specifying places where part of the clip data 1402 are reproduced, and (c) the like. Further, another embodiment of the AV content 1400 is such that (1) a single AV content 1400 includes a plurality of playlists 1401 . . . and (2) a playlist 1401 to be reproduced is selected depending on conditions.

The data management system 3 uses management information to manage an AV content 1400 (i.e., a playlist 1401 and clip data 1402) downloaded into the receiving apparatus 2. The present embodiment assumes that the management information is stored in the storage section 202 of the receiving apparatus 2 together with the AV content 1400 that is to be managed. However, the management information may be stored anywhere as long as it retains its correspondence with the AV content 1400.

Figure 2:
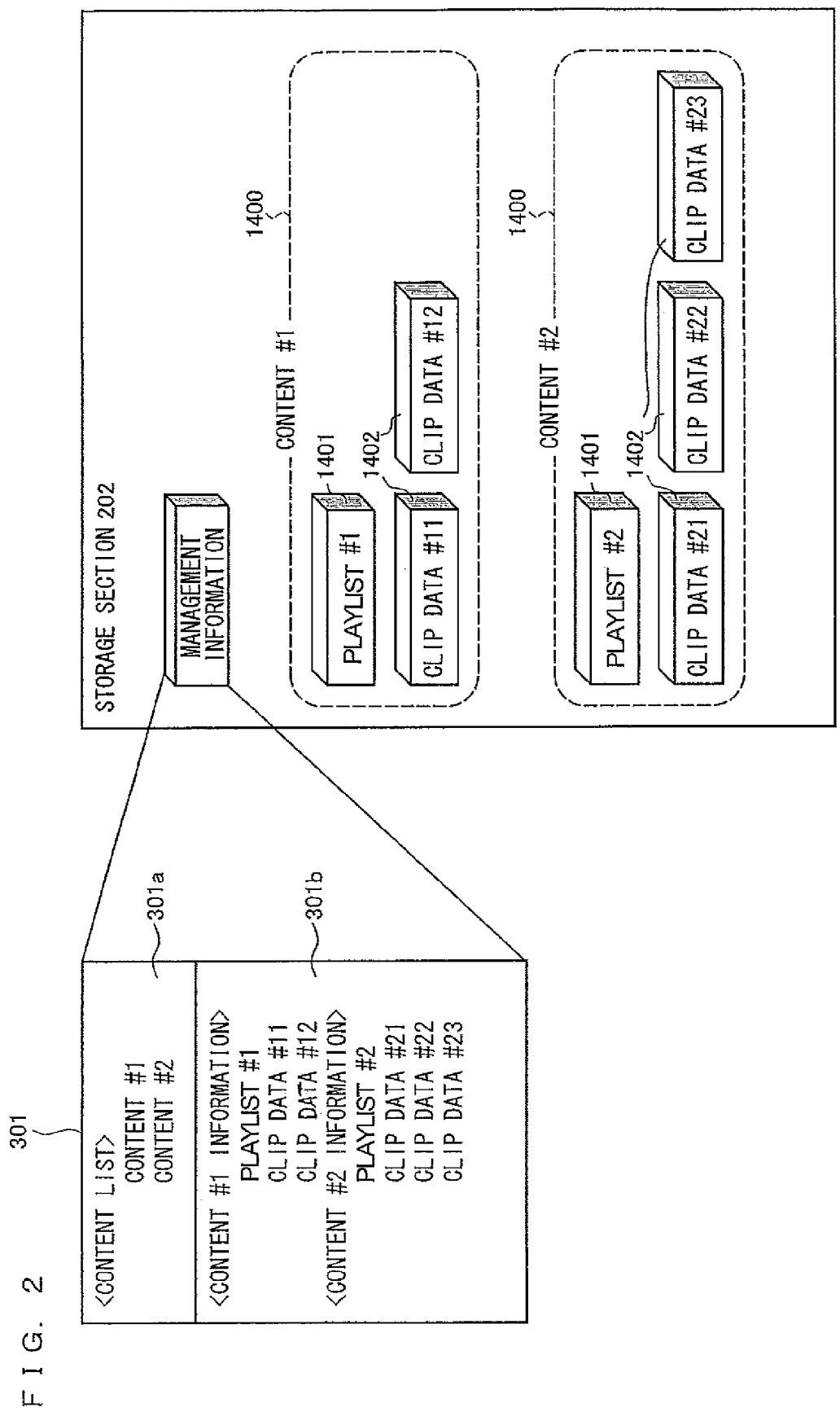
FIG. 2 is an explanatory diagram showing an example of a data structure of management information for use in data management systems respectively shown in FIGS. 1, 7, and 11.

FIG. 2 is an explanatory diagram showing an example of a data structure of management information 301 for use in the data management system 3.

As shown in FIG. 2, the management information 301 lists an AV content 1400 obtained by download and playlists 1401 and clip data 1402 together constituting the AV contents 1400. Specifically, the management information 301 includes (i) a content list 301*a* of AV contents 1400 stored in the storage section 202 and (ii) a data list 301*b* of playlists 1401 and clip data 1402 respectively constituting the listed AV contents 1400.

FIG. 2 shows a simple example of what is to be retained as the management information 301. The management information 301 may be in any description format as long as the same information is recorded. For example, the management information 301 can be described in an XML format.

The management information 301 is sent from the receiving apparatus 2 to the server apparatus 1 when an AV content 1400 is downloaded as described later, and is used for the server apparatus 1 to check and present a downloadable AV content 1400. Further, when the receiving apparatus 2 is used to erase an AV content 1400 already downloaded and stored, the management information 301 is used as information for specifying a playlist 1401 and clip data 1402 together constituting the AV content 1400.

In the following, for convenience of explanation, the AV content 1400, the playlist 1401, the clip data 1402, the management information 301 are referred to as "content", "playlist", "clip data", and "management information", respectively. Further, the following explanation assumes that the playlist and the clip data are arranged as different files. Similarly, the following explanation also assumes that the management information is a single independent file. However, in practice, the playlist, the clip data, and the management information do not need to be independent files.

(Example 1 of Download Operation—Case where Content #2 is Wholly Replaced)

Figure 3:
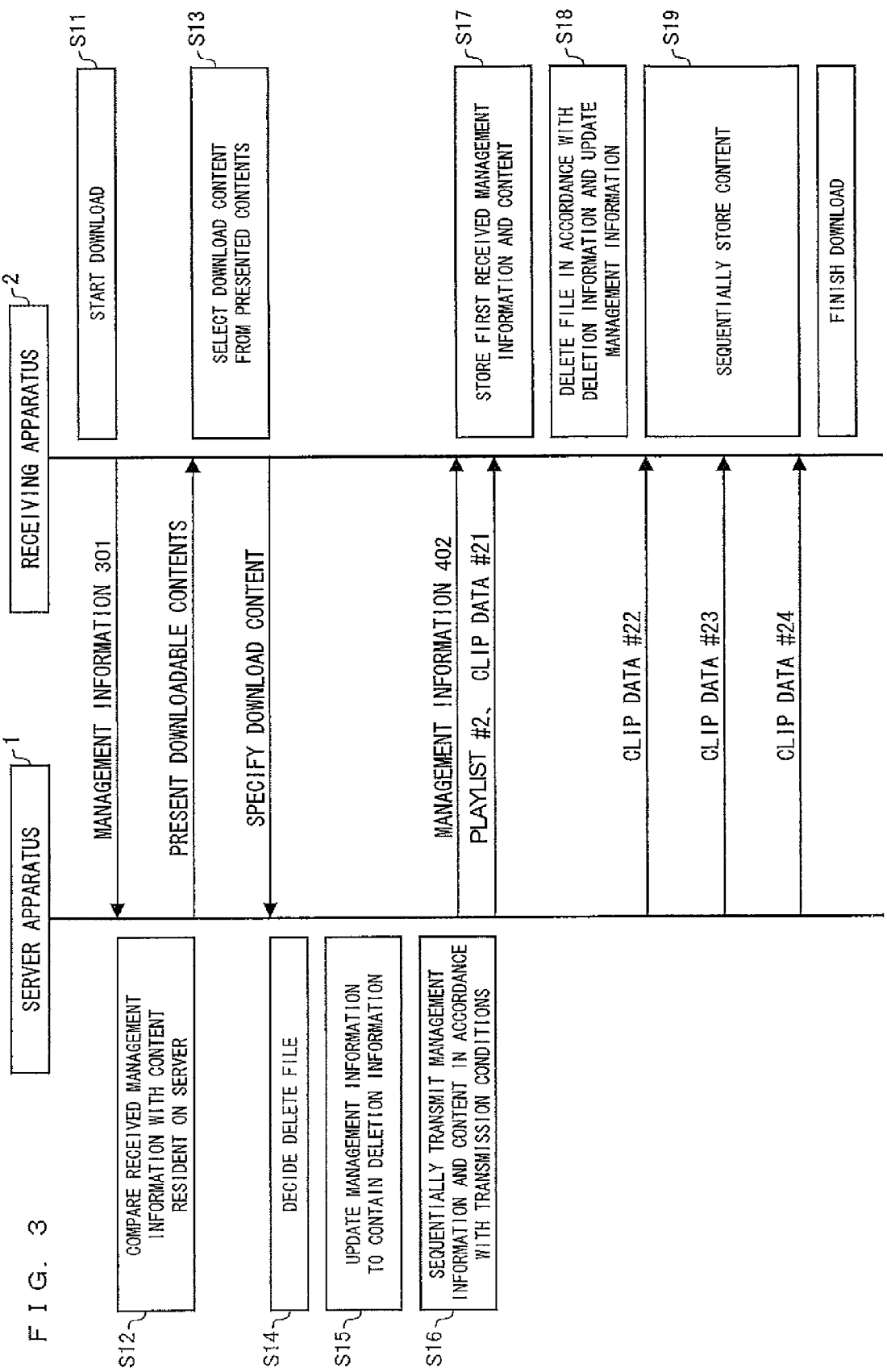
FIG. 3 is a process flow diagram showing an example of operation of the data management system shown in FIG. 1.

Referring to FIGS. 3 and 4, the functions each of the components of the data management system 3 will be explained along with a specific operation. FIG. 3 is a process flow diagram showing how the data management system 3 works when a content is newly downloaded into the receiving apparatus 2. FIG. 4 is an explanatory diagram showing how the management information is updated on this occasion.

First, assume that the receiving apparatus 2 has two contents (i.e., a content #1 and a content #2) already downloaded thereinto and that the two contents are stored in the storage section 202. The content #1 is an AV content including a playlist #1 and two clip data #11 and #12, and the content #2 is an AV content including a playlist #2 and three clip data #21, #22, and #23 (see FIG. 2). On this occasion, the storage section 202 of the receiving apparatus 2 stores a file of management information 301 (see FIG. 4) in addition to the playlist files and the clip data files. The management information 301 was created when the AV contents currently stored in the storage section 202 were downloaded (see S18 of FIG. 3).

Next, when the receiving apparatus 2 starts a download of a content (S11), the management information transmitting and receiving section 208 transmits the management information 301 from the storage section 202 to the server apparatus 1 via the input-output control section 201. The server apparatus 1 receives the management information 301 via the input-output control section 101, and inputs the management information 301 into the management information judgment section 103. As shown in FIG. 4, the management information 301 acquired from the receiving apparatus 2 by the server apparatus 1 is referred to as "management information 401" (whose content is identical to that of the management information 301).

The download can be started according to a user's conscious instructions given via the UI 204 of the receiving apparatus 2. Alternatively, the download can be started at a predetermined timing such as (i) a timing at which the receiving apparatus 2 is activated or (ii) a timing at which a removable medium (e.g., an optical disk or a memory card) recording data relevant to the content to be downloaded is mounted.

Next, the management information judgment section 103 of the server apparatus 1 makes a comparison between (i) the management information 401 (see FIG. 4, a copy of the management information 301) received from the receiving apparatus 2 and (ii) a content stored in the storage section 102 of the server apparatus 1, generates content presentation information specifying a content that can be downloaded by the receiving apparatus 2, and outputs the content presentation information to the receiving apparatus 2 via the input-output control section 101 (S12). Examples of the content that can be downloaded by the receiving apparatus 2 include (a) a content yet to be acquired by the receiving apparatus 2 and (b) a file which constitutes a content already downloaded by the receiving apparatus 2 and which needs to be replaced because the content thereof has been updated after the download.

Next, the receiving apparatus 2 receives, via the input-output control sections 101 and 201, the content presentation information outputted from the server apparatus 1, and causes the display section 203 to show the content presentation information. Moreover, the user uses the UI 204 to carry out an operation of specifying, from the content presentation information shown by the display section 203, a content to be downloaded. In accordance with the user's operation, the receiving apparatus 2 generates content designation information designating the content to be downloaded, and transmits the content designation information to the server apparatus 1 (S13).

For example, in cases where the server apparatus 1 has an updatable content #2 and a further transmittable content #3, the server apparatus 1 outputs, as content presentation information, information indicative of "content #2, content #3" to the receiving apparatus 2 in which the content #1 and the content #2 are stored as shown in FIG. 2. On this occasion, the content presentation information may be caused to contain information indicating that the content #2 is an "update" content and that the content #3 is a "new" content. The receiving apparatus 2 shows the content presentation information to the user. When the user decides to download the content #2 and uses the UI 204 to instruct the receiving apparatus 2 to download the content #2, the receiving apparatus 2 generates, as content designation information, information indicative of "content #2", and transmits the content designation information to the server apparatus 1. The information to be treated as the content presentation information and content designation information only needs to be information for the user or the receiving apparatus 2 to uniquely specify the content. Examples of such information include title information of the content and series information of the content.

As with the process carried out at the start of the download, the processes thus far carried out can be carried out automatically without aid from the user. For example, in a case such as that shown in Example 1, i.e., in cases where a content previously downloaded into the receiving apparatus 2 is always updated when a content residing on the server apparatus 1 and corresponding to the content is updated, the content can be updated by download without a special instruction given from the user.

In the following, Example 1 explains a case where the content #2 already downloaded is a content to be downloaded and where the content #2 already downloaded has been updated. Specifically, at the start of a download, the playlist #2 and the three clip data #21 to #23 are stored as the content #2 in the storage section 202 of the receiving apparatus 2. On the other hand, new clip data #21 to #24 and a new playlist #2 referring to the four clip data are stored as a new content #2 in the storage section 102 of the server apparatus 1. Moreover, assume that the content #2 which has already been stored in the receiving apparatus 2 and which includes the playlist #2 and the clip data #21 to #23 is replaced by the new content #2 which is stored in the server apparatus 1 and which includes the new playlist #2 and the new clip data #21 to #24.

Subsequently, when the server apparatus 1 receives, from the receiving apparatus 2, the content designation information designating the content to be downloaded, the deletion information decision section 104 checks transmission conditions under which the new content #2 is transmitted from the server apparatus 1 to the receiving apparatus 2, and specifies a file which the receiving apparatus 2 is to be instructed to delete (S14).

The term "transmission conditions" used herein refers to a speed at which transmission can be carried out, the transmission bandwidth of a data transmission line, a rate of incidence of error, the QoS (quality of service) of a delivery system, and the like. These transmission conditions are determined in accordance with the performance of the server apparatus 1 or the operation regulations of a data transmission line or service used. In consideration of these transmission conditions, the server apparatus 1 determines an amount of data whose transmission can be started at the same timing and a transmission timing at which data to be continuously transmitted are transmitted.

Further, a file which the receiving apparatus 2 is to be instructed to delete is specified in the following manner. First, files to be replaced by transmitting the new content #2 are specified from among the files described in the management information 401. Next, since a transmission timing at which a file is transmitted is determined in consideration of the aforementioned transmission conditions, files that are transmitted at the same timing as the management information are excluded from the files specified to be replaced. The remaining files are files which the receiving apparatus 2 is to be instructed to delete.

In Example 1 shown in FIGS. 3 and 4, it is assumed in view of the transmission conditions that when the new content #2 is sent from the server apparatus 1 to the receiving apparatus 2, the playlist (#2) and the first clip data (#21) are transmitted at the same timing as the management information (after-update management information 402). Further, it is assumed in view of the transmission conditions that the second and subsequent clip data (#22, #23, #24) are transmitted later than the playlist (#2) and the first clip data (#21).

On this occasion, as for the clip data #22 and #23 of the clip data #22 to #24 that are transmitted later, clip data files having names identical to those of the clip data #22 and #23 have been already stored in the receiving apparatus 2. For this reason, when the receiving apparatus 2 tries to reproduce the content #2 with the use of the old playlist #2 before the new clip data #22 and #23 are downloaded, the old clip data #22 and #23 are referred to, so that reproduction is wrongly performed.

For this reason, the deletion information decision section 104 of the server apparatus 1 designates the clip data #22 and #23 as files that are to be deleted in advance by the receiving apparatus 2. Information designating the files that are to be deleted in advance is referred to as "deletion information" (402c of FIG. 4).

It is assumed that the server apparatus 1 always has the most recent content registered therein, and a judgment as to whether a content stored in the receiving apparatus 2 is different from that registered in the server apparatus 1 is made by making a comparison between (i) the time at which the most recent content was registered in the serve apparatus 1 and (ii) the time at which the content was last downloaded into the receiving apparatus 2. Alternatively, a judgment as to whether or not a content has been updated can be made in a simple manner by making a comparison of file size or created time.

Subsequently, the management information update section 105 of the server apparatus 1 creates the after-update management information 402, containing the deletion information 402c generated by the deletion information decision section 104, which is to be sent to the receiving apparatus 2 (S15). Specifically, the management information update section 105 of the server apparatus 1 updates the original management information 401 so that the information concerning the content #2 is updated to new information (a content list 402a (playlist #2) and a data list 402b (clip data #21 to #24)). At the same time or after the update, the management information update section 105 of the server apparatus 1 adds the deletion information 402c (information designating the clip data #22 and #23) specified by the deletion information decision section 104, thereby creating the new management information 402. In the management information 402 shown in FIG. 4, the content files to be updated by the download are indicated by boldface.

Next, the server apparatus 1 sequentially transmits, to the receiving apparatus 2 via the input-output control sections 101 and 201, a content (playlist, clip data) stored in the storage section 102, together with the management information 402 updated by the management information update section 105 (S16). On the other hand, the receiving apparatus 2 stores, in the storage section 202, the content (playlist, clip data) received from the server apparatus 1 (S17). On this occasion, all the files that constitute the content are not downloaded at the same time as the management information 402. Instead, part of the files (clip data #22 to #24 in Example 1) are transmitted belatedly depending on the transmission conditions and the like.

Upon receiving the updated management information 402 from the server apparatus 1, the receiving apparatus 2 deletes the files designated by the deletion information 402c, and updates the management information (S18). Specifically, the deletion section 205 reads the management information 402 from the storage section 202. When the management information 402 contains the deletion information 402c, the deletion section 205 deletes the designated files (clip data #22 and #23) in accordance with the deletion information 402c. Then, after the deletion section 205 has deleted the files, the management information update section 206 replaces, with management information 403 obtained by deleting the deletion information 402c from the management information 402, the management information 301 stored in the storage section 202.

Thereafter, the receiving apparatus 2 sequentially stores, in the storage section 202, the clip data #22, #23, and #24 sent from the server apparatus 1 (S19). The download process is finished at the point of time when all the data have been stored.

The following explains how the receiving apparatus 2 reproduces a content.

In cases where the receiving apparatus 2 reproduces a content, the reproduction section 207 calls up, via the input-output control section 201, a content downloaded and stored in the storage section 202, reproduces the content, and outputs the content to the display section 103. That is, in cases where a content is reproduced, a playlist corresponding to the content is called up, and reproduction is performed by sequentially reading out clip data referred to by the playlist. Specifically, when the playlist #2 downloaded as described above designates that the clip data #21 to #24 are reproduced in sequence, the reproduction section 207 carries out an operation of sequentially reading out and reproducing the clip data #21 to #24.

Further, after the download is started and the old clip data #22 is deleted in accordance with the deletion information 402c and in cases where reproduction of the content #2 is started before the new clip data #22 is downloaded, there is no clip data #22 in the storage section 202. Therefore, the reproduction section 207 suspends reproduction until the download of the clip data #22 is completed. Alternatively, the reproduction section 207 may finish the reproduction process by regarding the reproduction as improper.

Thus, in the data management system 3, the previously stored clip data #22 has been deleted from the storage section 202 due to the data management performed by using the deletion information 402c, so that an existing file is not wrongly reproduced. In particular, in cases where a content creator does not want reproduction to be performed by using an old file, it is possible to prohibit reproduction from being performed against the content creator's intention.

The data management in the data management system 3 can adopt a playlist which designates both an order in which clip data are reproduced and a reproducing section contained in the clip data, as well as a playlist, such as that described above, which simply designates only an order in which clip data are reproduced.

Further, when a content (playlist, clip data) has been replaced by executing a download as described in Example 1, a change in playlist may cause clip data that are not referred to by any playlist to be left in the receiving apparatus 2. In this respect, by deleting the files in accordance with the deletion information 402c, it is possible to prevent clip data that are not referred to by any playlist from being left in the receiving apparatus 2 due to an update made at the time of a download. For example, see FIG. 4. In cases where the playlist #2 newly sent from the server apparatus 1 is a playlist referring only to the clip data #21 and #22, the clip data #23 left in the receiving apparatus 2 is designated by deletion information, and is deleted. In this way, the redundant clip data #23 no longer referred to is not left in the receiving apparatus 2. This makes it possible to efficiently use the recording region (storage section 202) of the receiving apparatus 2.

(Example 2 of Download Operation—Case where Content #2 is Partially Replaced)

Figure 5:
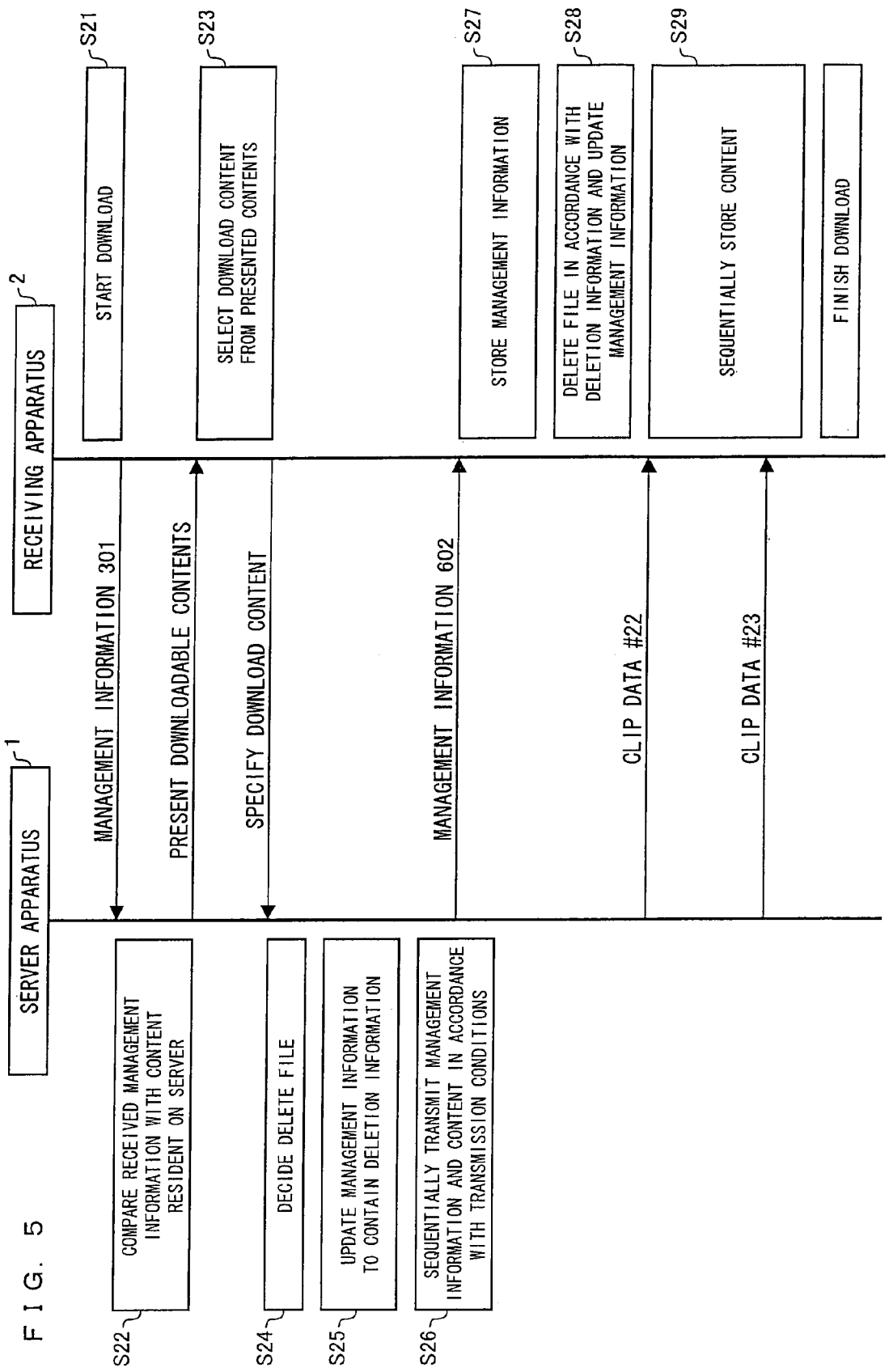
FIG. 5 is a process flow diagram showing another example of operation of the data management system shown in FIG. 1.
Figure 6:
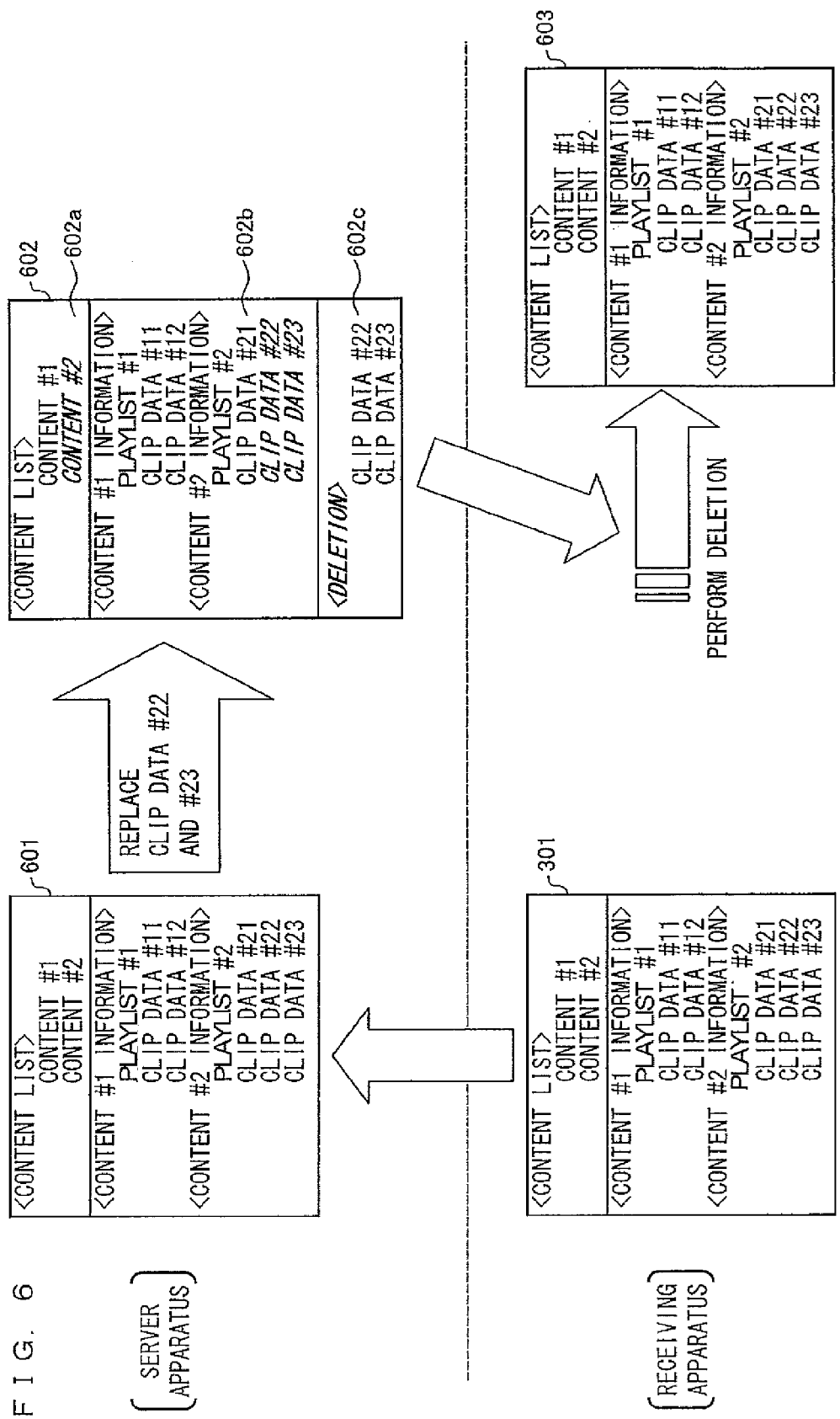
FIG. 6 is an explanatory diagram showing how the management information is updated in accordance with the process flow of the example of operation shown in FIG. 5.

In the following, another example of the download process carried out by the data management system 3 is shown with reference to FIGS. 5 and 6. FIG. 5 is a process flow diagram showing how the data management system 3 works when a content is newly downloaded into the receiving apparatus 2. FIG. 6 is an explanatory diagram showing how the management information is updated on this occasion.

Whereas Example 1 (see FIGS. 3 and 4) shows a case where the whole of the content (i.e., all the playlist and clip data together constituting the content) is replaced, Example 2 shows a case where only part of the clip data constituting the content is replaced.

Respective operations of Steps S21 to S29 of FIG. 5 are about the same as those of Steps S11 to S19 of FIG. 3 already explained, except for the following two points: (1) In Step S24, deletion information (a file to be deleted) is decided such that, among the files constituting the content #2, the existing playlist #2 and clip data #21 are used and only the clip data #22 and the clip data #23 are replaced; and (2) In Steps S26 and S27, only management information is transmitted first from the server apparatus 1 to the receiving apparatus 2. Therefore, the following provides only a schematic explanation.

The server apparatus 1 receives the management information 301 via the input-output control section 101, and inputs the management information 301 into the management information judgment section 103. As shown in FIG. 6, the management information 301 is referred to as "management information 601" in the server apparatus 1.

Next, as in Example 1 (S14), the deletion information decision section 104 of the server apparatus 1 checks transmission conditions under which a new content #2 is transmitted from the server apparatus 1 to the receiving apparatus 2, specifies a file that is to be deleted by the receiving apparatus 2, and generates deletion information 602c designating the file that is to be deleted in advance (S24).

Next, the management information update section 105 of the server apparatus 1 generates updated management information 602, containing the deletion information 602c generated by the deletion information decision section 104, which is to be sent to the receiving apparatus 2 (S25). Then, the management information update section 105 transmits, to the receiving apparatus 2, the management information 602 containing the deletion information 602c (S26). In the management information 602 shown in FIG. 6, the content files to be updated by the download are indicated by boldface.

Subsequently, as soon as the receiving apparatus 2 receives the management information 602, the deletion section 205 deletes, from the storage section 202, the clip data files (clip data #22 and #23) designated by the deletion information 602c. Then, after the deletion section 205 deletes the files, the management information update section 206 replaces, with management information 603 obtained by excluding the deletion information 602c from the management information 602, the management information 301 stored in the storage section 202 (S28).

Thereafter, the receiving apparatus 2 sequentially stores, in the storage section 202, the clip data #22 and #23 sent from the server apparatus 1 (S29). The download process is finished at the point of time when all the data have been stored.

By thus carrying out such a download process of replacing only updated clip data, it is possible to minimize communications traffic. Further, for example, even in cases where a content has a non-rewritable playlist, it is possible to freely change a result to be obtained by reproducing the content.

As described above, in the data management system 3 according to the present embodiment, the server apparatus 1 specifies a file (clip data) that may be wrongly referred to, generates management information containing, as deletion information, information concerning the file, and sends the management information to the receiving apparatus 2. The receiving apparatus 2 deletes the file in accordance with the deletion information contained in the management information. With this, it is possible to delete an existing file at the same time as a download is executed. This makes it possible to prevent wrong reproduction from being performed by wrongly referring to the existing file.

Furthermore, in the data management system 3, the content of management information of each receiving apparatus 2 can be managed in the server apparatus 1. This makes it possible to take measures against an illegal copy of a file, for example, by prohibiting the receiving apparatus 2 from reproducing a data file that is not described in the management information.

In the present embodiment, the playlist and clip data together constituting the content and the management information are described as independent files, but do not need to be independent files. For example, the playlist, the clip data, and the management information remain essentially the same even when the playlist, the clip data, and the management information are bit stream data respectively stored in a playlist data region, a clip data region, and a management data region together contained in a content data stream, so that a data management system of the present invention can be applied without problems. In this respect, the same applies to Embodiments 2 and 3 described later.

Further, in the present embodiment, the receiving apparatus 2 has management information directly listing a content (name) and a file (name). However, for example, it is possible that the server apparatus 1 records in advance a list of constituent files of each version of a content and the receiving apparatus 2 stores management information containing only a content and version information on the content. In this case, a file to be deleted can be decided by the server apparatus 1 (i) by reading out the list of the constituent files corresponding to the version information of the content contained in the management information and (ii) by comparing the list with a list of constituent files of an updated version of the content.

Embodiment 2

Another embodiment of the present invention will be described below with reference to FIGS. 7 through 10. For convenience of explanation, components having the same functions as those described in Embodiment 1 are given the same referential marks, and will not be explained. Further, unless otherwise noted, the terms whose definitions are given in Embodiment 1 are used on the basis of the same definitions in the present embodiment.

FIG. 7 is a functional block diagram showing a structure of a data management system 3' according to Embodiment 2.

The structure of the data management system 3' is about the same as that of the data management system 3 (see FIG. 1) of Embodiment 1; therefore, only the difference is explained. Note that the data management system 3' includes a storage section 202', a file management section 205', and a reproduction section 207' instead of the storage section 202, the deletion section 205, and the reproduction section 207.

In the data management system 3 according to Embodiment 1 described above, when a file with the same name a file already stored in the storage section 202 has been downloaded into the receiving apparatus 2, the file already stored in the storage section 202 is always overwritten. That is, the previous file is never left.

On the other hand, in the data management system 3' according to Embodiment 2, a plurality of save destinations are prepared, so that a new file with the same name as a file already stored in the storage section 202 is (i) downloaded while the file already stored in the storage section 202 is retained, (ii) stored in another region, and (iii) reproduced at the time of reproduction. With this, in the data management system 3', the file structure of a content can be returned to what it was before the download.

Specifically, in the data management system 3', a plurality of save destinations are prepared in the storage section 202', for example, by dividing a directory. Moreover, if there is a new download file with the same name as the previous file, the file management section 205' carries out a process so that the previous file is not erased and the new download file is stored in a directory different from a directory in which the previous file is stored. Moreover, at the time of content reproduction, the reproduction section 207' selects, in accordance with an order of priority in which the directories are arranged, a file of a top-priority directory from among the files which have the same name and which are stored in the different directories, and reproduces the file thus selected. The selection based on the order of priority is based on a mechanism similar to the path function of a Unix® operation system or Windows®, and will not be particularly explained here.

Figure 8:
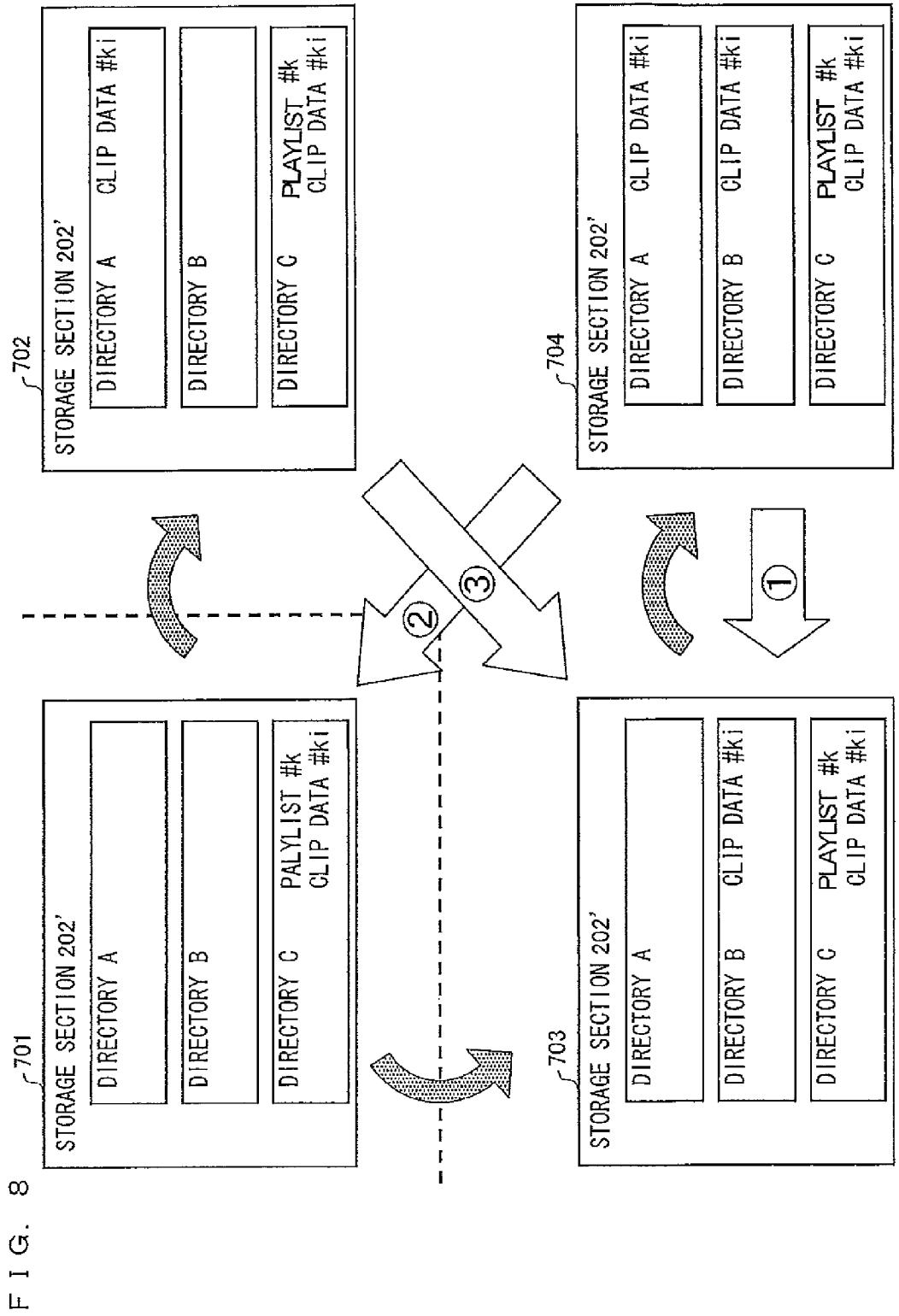
FIG. 8 is an explanatory diagram showing an internal structure of a storage section of the data management system shown in FIG. 7.
Figure 9:
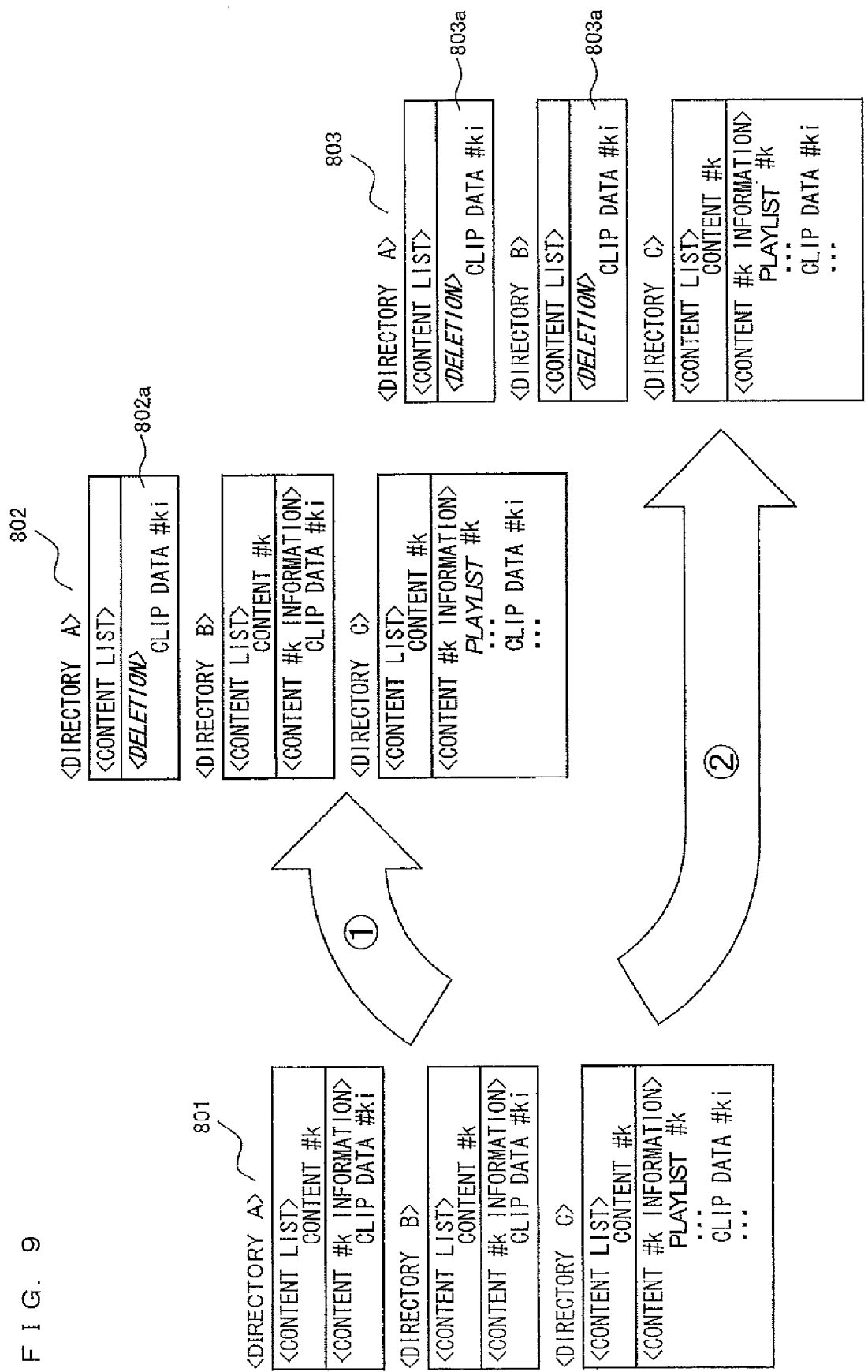
FIG. 9 is an explanatory diagram showing a specific example of how the management information is updated in the data management system shown in FIG. 7.
Figure 10:
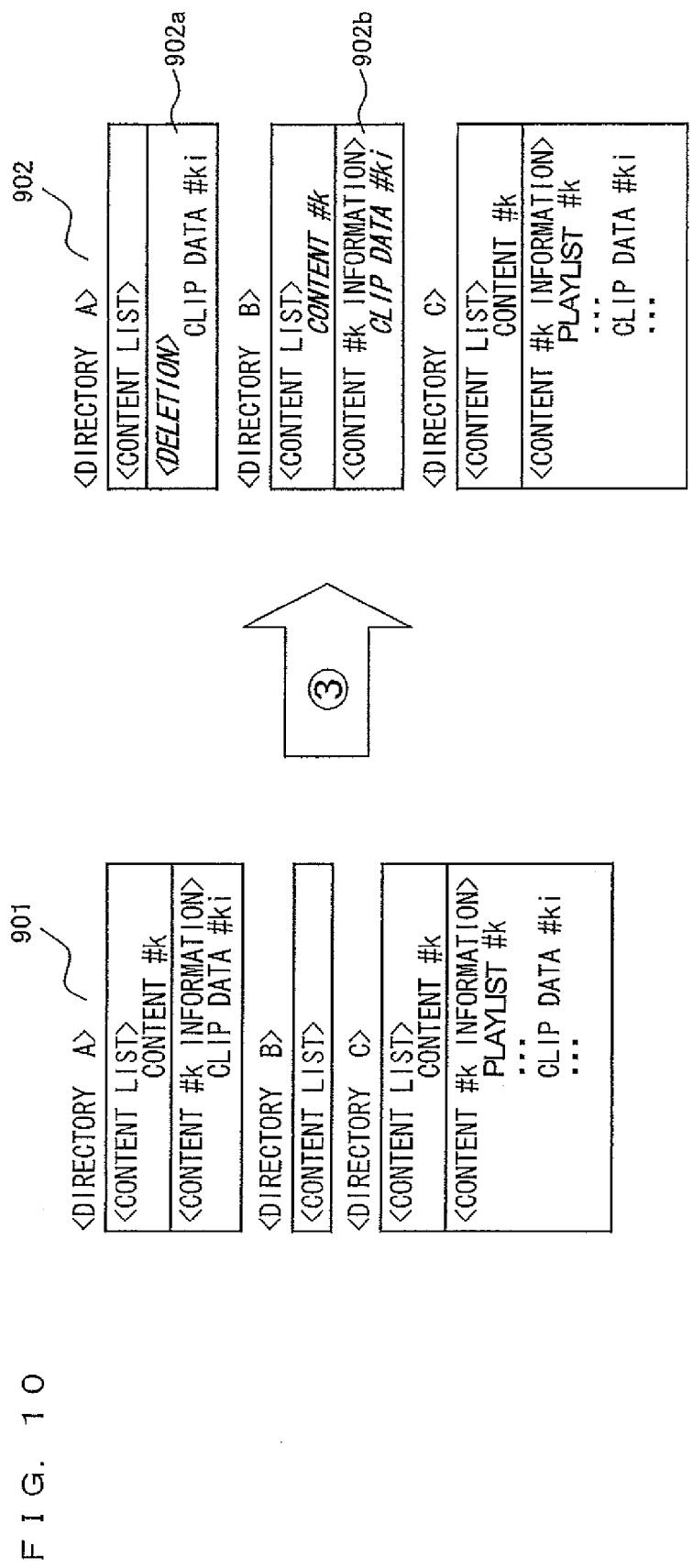
FIG. 10 is an explanatory diagram showing a specific example of how the management information is updated in the data management system shown in FIG. 7.

Referring to FIGS. 8 through 10, the functions of each of the components of the data management system 3' will be explained below along with a specific operation. FIG. 8 is an explanatory diagram showing a structure of a recording region of the storage section 202' of the data management system 3'.

The storage section 202' is divided into a plurality of different recording regions (directories A, B, and C of FIG. 8), and files with the same name can be respectively stored in the recording regions. Moreover, the recording regions are arranged in advance in an order of priority. When the reproduction section 207' reproduces a file having a certain name, the reproduction section 207' reproduces a file recorded in a top-priority recording region, the file being selected from files which have the same name and which stored in the recording regions. Note that the reproduction section 207' (or the file management section 205' or the like) retains information concerning the order of priority in which the recording regions are arranged.

FIG. 8 assumes that each of the plurality of recording regions contained in the storage section 202' is shown as a logical storage location such as "directory". However, the present invention is not limited to this. For example, the recording region may be shown as a physical storage location such as "sector region" of data.

Here, in FIG. 8, the directories A, B, and C are arranged in an order of priority so that A>B>C. That is, the directory A is given the highest priority, and the directory C is given the lowest priority.

Moreover, as indicated by the state 701, it is assumed that a playlist #k and clip data #ki are stored in the directory C. The playlist #k refers to the clip data #ki, and the clip data #ki is referred to by the playlist #k.

In the state 701, when clip data #ki with the same name is downloaded from the server apparatus 1 into the receiving apparatus 2', the file management section 205' stores the clip data #ki in the directory A (or directory B) as indicated by the state 702 (or state 703). Moreover, when the playlist #k is reproduced in the state 702 (or state 703), the reproduction section 207' performs reproduction with reference to the clip data #ki stored in the directory A (or directory B) given higher priority than is the directory C.

Further, different clip data #ki with the same name is further downloaded in the state 703, the file management section 205' stores the new clip data #ki in the directory A as indicated by the state 704. Moreover, when the playlist #k is reproduced in the state 704, the reproduction section 207' performs reproduction with reference to the clip data #ki stored in the directory A given the highest priority.

Here, when the data management system 3' of Embodiment 2 performs data management, an update process to be carried out at the time of a download as explained below in Example 3 or 4 is needed in addition to the process explained in Embodiment 1. Even when the data management system 3' performs data management, download data can be appropriately managed by adopting management information containing deletion information.

(Example 3 of Download Operation—Case where Only Deletion of Existing Clip Data is Performed)

The following explains an operation of, when a download is performed in the state 704 (in which the clip data #ki with the same name are respectively stored in the directories A, B, and C) of FIG. 8, making an update so that the playlist #k can refer to the clip data #ki already stored in the directory B given low priority or to the clip data #ki resident on the directory C.

In this case, it is only necessary to delete the clip data #ki resident on the high-priority directory. Therefore, management information containing deletion information indicative of the deletion of the clip data #ki resident on the high-priority directory is sent from the server apparatus 1 to the receiving apparatus 2'.

Note that when the server apparatus 1 creates management information, the server apparatus 1 needs to know the order of priority in which the directories of the receiving apparatus 2' are arranged. It is assumed that when the server apparatus 1 establishes communication with the receiving apparatus 2', the server apparatus 1 preliminarily acquires, from the receiving apparatus 2', information concerning the order of priority in which the directories are arranged. Alternatively, see a case where the receiving apparatus 2' is a receiving apparatus designed exclusively for a data delivery service shown in the present invention, and conforms to service specifications so as to have a predetermined directory structure and a predetermined order of priority. In this case, without needing to receive the information concerning the order of priority, the server apparatus 1 can create management information in consideration of the directory structure and the order of priority of the receiving apparatus 2'.

FIG. 9 is an explanatory diagram specifically showing how management information is updated in the data management system 3'. Management information 801 shown in FIG. 9 is original management information that the server apparatus 1 receives from the receiving apparatus 2'. Management information 802 and management information 803 are each management information to be sent from the server apparatus 1 to the receiving apparatus 2'. Note that each of the circled numbers of FIGS. 8 and 9 indicates a corresponding relationship between a change in management information and a change in state of the storage section 202'.

As soon as the receiving apparatus 2' receives the management information 802 (or 803), the file management section 205' deletes files residing on the directories A and B and corresponding to deletion information 802a (or 803a). As a result, the storage section 202' of the receiving apparatus 2' is updated so as to be in the state 703 (or state 701) shown in FIG. 8. Therefore, when the reproduction section 207' performs reproduction in accordance with the playlist #k, the reproduction section 207' can perform the reproduction by correctly referring to the clip data #ki stored in the directory B (or directory C).

(Example 4 of Download Operation—Case where Deletion of Existing Clip Data and Addition of New Clip Data are Performed Simultaneously)

The following explains an operation of, when a download is performed in the state 702 (in which the clip data #ki with the same name are respectively stored in the directories A and C), storing new clip data #ki in the directory B and making a change so that the playlist #k refers to the new clip data #ki.

FIG. 10 is an explanatory diagram specifically showing how management information is updated in the data management system 3'. Management information 901 shown in FIG. 10 is original management information that the server apparatus 1 receives from the receiving apparatus 2'. Management information 902 is management information to be sent from the server apparatus 1 to the receiving apparatus 2'. Note that each of the circled numbers of FIGS. 8 and 10 indicates a corresponding relationship between a change in management information and a change in state of the storage section 202'.

In Example 4, the management information 902 shown in FIG. 10 is sent from the server apparatus 1 to the receiving apparatus 2'. That is, the management information 902 is caused to contain (i) a data list 902b indicative of clip data #ki to be newly stored in the directory B and (ii) deletion information 902a for deleting the clip data #ki already stored in the directory A, and is transmitted from the server apparatus 1 to the receiving apparatus 2'. Then, as soon as the receiving apparatus 2' receives the management information 902, the file management section 205' deletes the clip data #ki corresponding to the deletion information 902a and resident on the directory A. Further, as soon as the receiving apparatus 2' receives the new clip data #ki, the file management section 205' stores the new clip data #ki in the directory B. As a result, the storage section 202' of the receiving apparatus 2' is updated so as to be in the state 703 of FIG. 8. Therefore, when the reproduction section 207' performs reproduction in accordance with the playlist #k, the reproduction section 207' can performed the reproduction be correctly referring to the clip data #ki resident on the directory B.

According to the above explanation, each of the directories A, B, and C is described as a region in which a download file can be stored. However, the present invention is not limited to this. For example, it is possible that (i) the directory C is a non-rewritable region in which default content data are always stored and (ii) each of the directories A and B is a rewritable region in which temporary data for replacing the non-rewritable content data of the directory C at the time of reproduction are stored as needed. In this case, the directory C is a fixed data region whose stored content is not changed, so that management information of the directory C does not need to be particularly defined.

Further, in cases where content data (clip data) are belatedly downloaded as with Embodiment 1 in a state in which there are a plurality of recording regions (directories A, B, and C) as shown in FIG. 8, the server apparatus 1 carries out a check for each of the recording regions as to whether or not the recording region stores a data file (file to be deleted) having the same name as the content data to be belatedly downloaded, generates management information containing deletion information, and sends the management information to the receiving apparatus 2'. Then, the receiving apparatus 2' deletes, in accordance with the deletion information, a corresponding data file stored in each of the recording regions. On this occasion, in cases where there exists a non-rewritable region as described above, it is impossible to delete a data file recorded in the non-rewritable region.

For this reason, in response to deletion information indicative of deletion of a data file recorded in a non-rewritable recording region, a process of prohibiting the receiving apparatus 2' from referring to or reproducing the data file is added. Alternatively, in cases where the server apparatus 1 already knows that it is impossible to delete a to-be-deleted data file stored in the receiving apparatus 2', the server apparatus 1 may generate management information containing reference (reproduction) prohibition information designating a file to which the receiving apparatus 2' is prohibited from referring in performing reproduction, and may send the management information to the receiving apparatus 2'. With this, the receiving apparatus 2' finds that it is prohibited from referring to (reproducing) the data file already stored therein. This allows the receiving apparatus 2' to perform reproduction by correctly referring to a data file that is to be obtained later by download.

Embodiment 3

Another embodiment of the present invention will be described below with reference to FIGS. 11 through 13. For convenience of explanation, components having the same functions as those described in Embodiments 1 and 2 are given the same referential marks, and will not be explained. Further, unless otherwise noted, the terms whose definitions are given in Embodiments 1 and 2 are used on the basis of the same definitions in the present embodiment.

In the data management systems 3 and 3' (see FIGS. 1 and 7) according to Embodiments 1 and 2 described above, the server apparatus 1 carries out an update of management information for managing a file in the receiving apparatuses 2 and 2'. On the other hand, in a data management system 30 according to Embodiment 3, a receiving apparatus 20 carries out an update of management information entirely.

Figure 11:
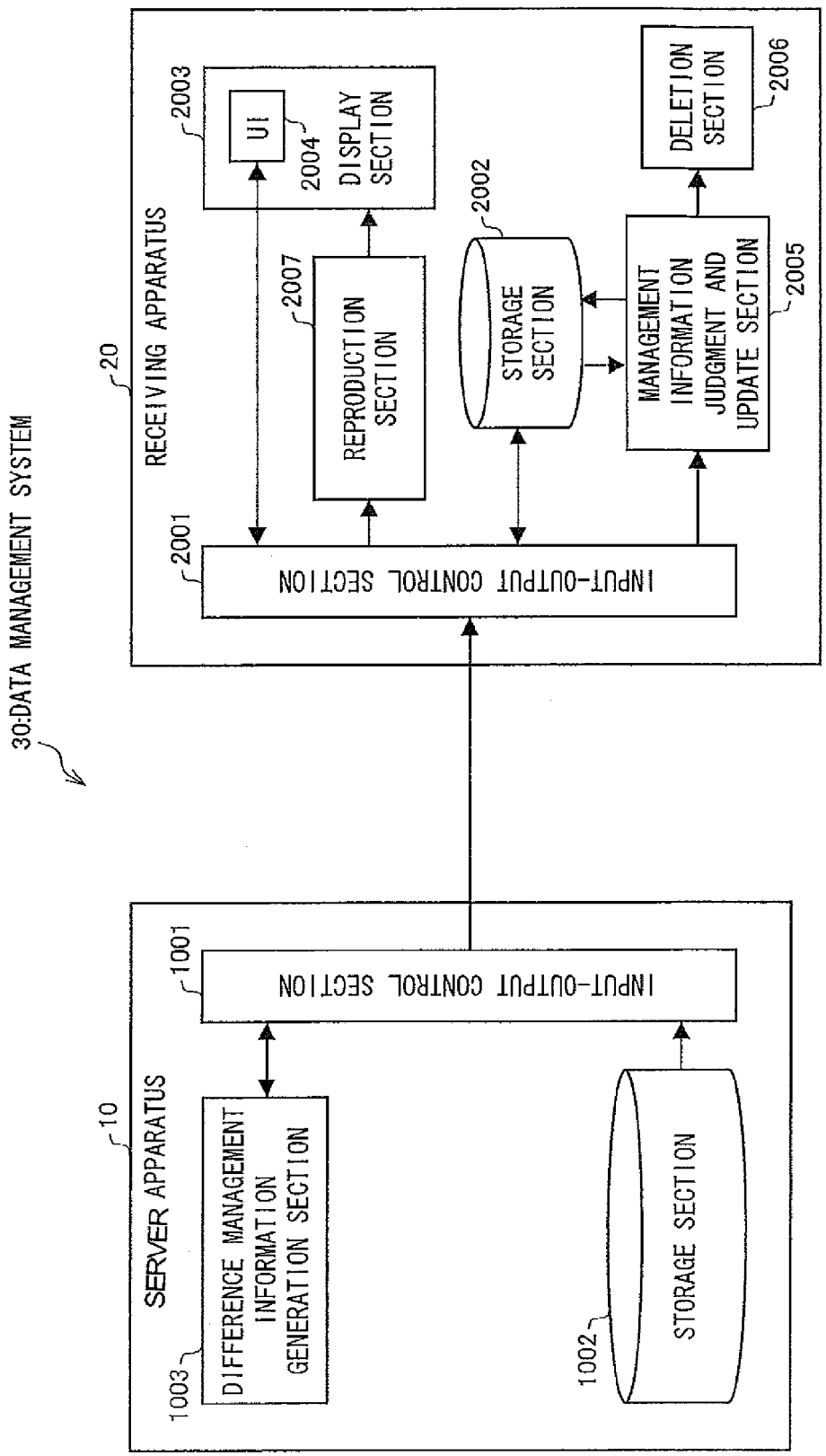
FIG. 11 is a functional block diagram showing a structure of a data management system according to another embodiment of the present invention.

FIG. 11 is a functional block diagram showing a structure of a data management system 30 according to Embodiment 3 of the present invention.

The data management system 30 includes: a server apparatus 10, which stores and sends out a large number of AV contents; and a receiving apparatus 20, which receives, stores, and reproduces an AV content sent from the server apparatus 10.

The server apparatus 10 includes an input-output control section 1001, a storage section 1002, and a difference management information generation section 1003. Further, the receiving apparatus 20 includes an input-output control section 2001, a storage section 2002, a display section 2003, a UI (user interface) 2004 (included in the display section 2003), a management information judgment and update section 2005, a deletion section 2006, and a reproduction section 2007. Among these, the input-output control section 1001 and storage section 1002 of the server apparatus 10 and the input-output control section 2001, storage section 2002, display section 2003, UI 2004, deletion section 2006, and reproduction section 2007 of the receiving apparatus 20 have the same functions as those of the functional blocks shown in Embodiments 1 and 2, namely the input-output control section 101 and storage section 102 of the server apparatus 1 and the input-output control section 201, storage sections 202 and 202', display section 203, UI 204, deletion section 205, file management section 205', reproduction section 207 and 207' of the receiving apparatuses 2 and 2'.

A comparison among FIGS. 1, 7, and 11 shows that the server apparatus 10 includes the difference management information generation section 1003 instead of the management information judgment section 103, deletion information decision section 104, management information update section 105 of the server apparatus 1 and that the receiving apparatus 20 includes the management information judgment and update section 2005 instead of the management information update section 206 of the receiving apparatuses 2 and 2'.

In the data management system 30, the server apparatus 10 transmits, to one or more receiving apparatuses 20, an AV content (file group) including a plurality of data files (playlist, clip data). Moreover, in particular, the server apparatus 10 includes the difference management information generation section (management information transmitting means) 1003 for transmitting, to each of the receiving apparatuses 20, management information specifying a (second) data file constituting an AV content that is to be newly transmitted to the receiving apparatus 20, the receiving apparatus 20 being a destination of the AV content.

Further, in the data management system 30, the receiving apparatus 20 receives, from one or more server apparatuses 10, an AV content (file group) including a plurality of data files (playlist, clip data), and stores the AV content in the storage section 2002. Moreover, in particular, the receiving apparatus 2 includes the management information judgment and update section (file decision means) 2005 and the deletion section (fine management means) 2006. The management information judgment and update section 2005 receives, from the server apparatus 10, management information specifying a (second) data file constituting an AV content that is to be newly received from the server apparatus 10. In accordance with the management information, the management information judgment and update section 2005 decides a first data file from among (first) data files which have been already stored in the storage section 2002, the (first) data file to be decided being so deleted as to be prevented from being used in the receiving apparatus 20 when the (second) data file is stored in the storage section 2002. The deletion section 2006 deletes, from the storage section 2002, the (first) data file thus decided.

The file so deleted from the storage section 2002 as to be prevented from wrongly used does not need to be deleted. Instead, the file may be prohibited or restricted from being used.

Figure 12:
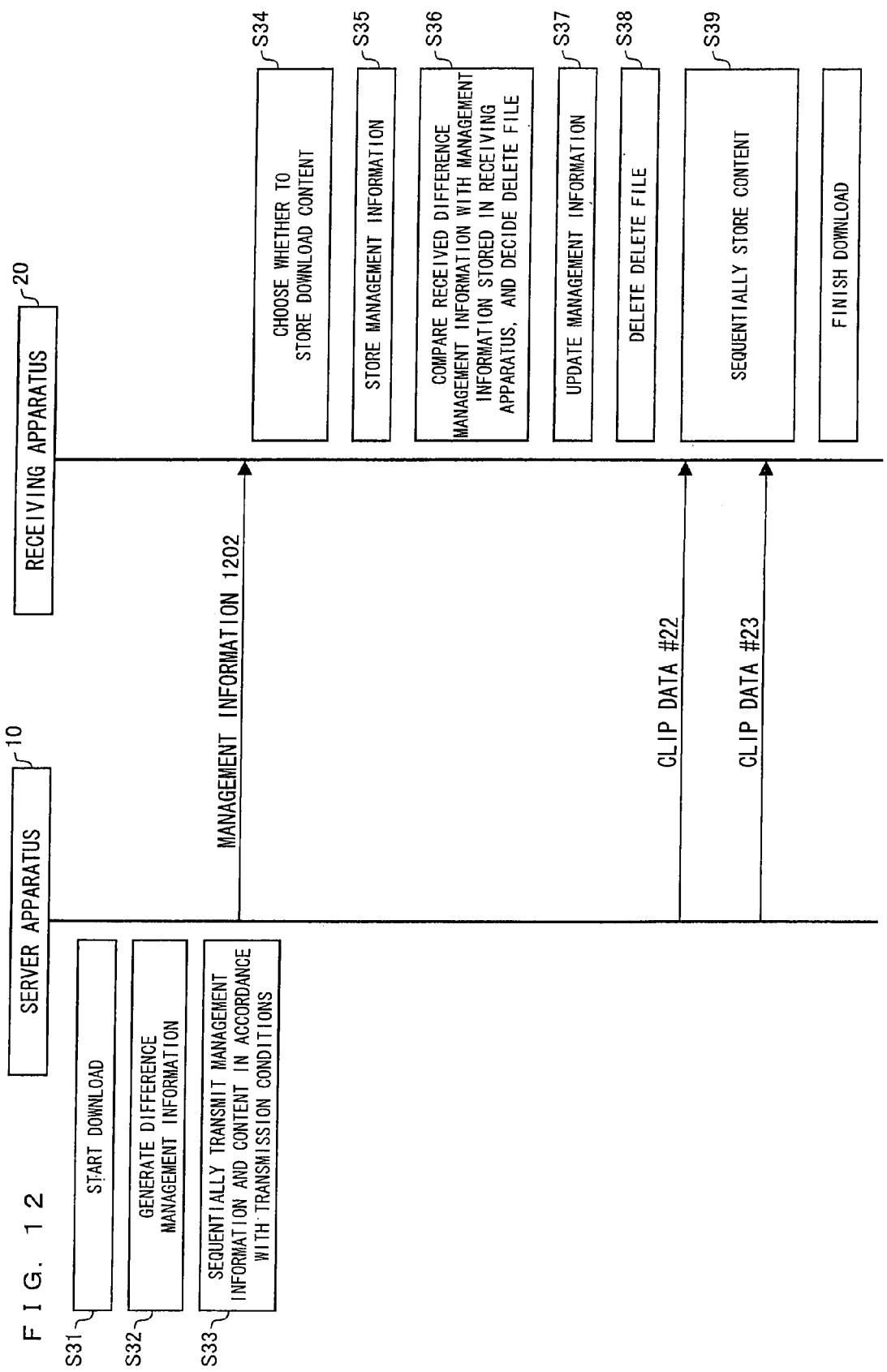
FIG. 12 is a process flow diagram showing an example of operation of the data management system shown in FIG. 11.
Figure 13:
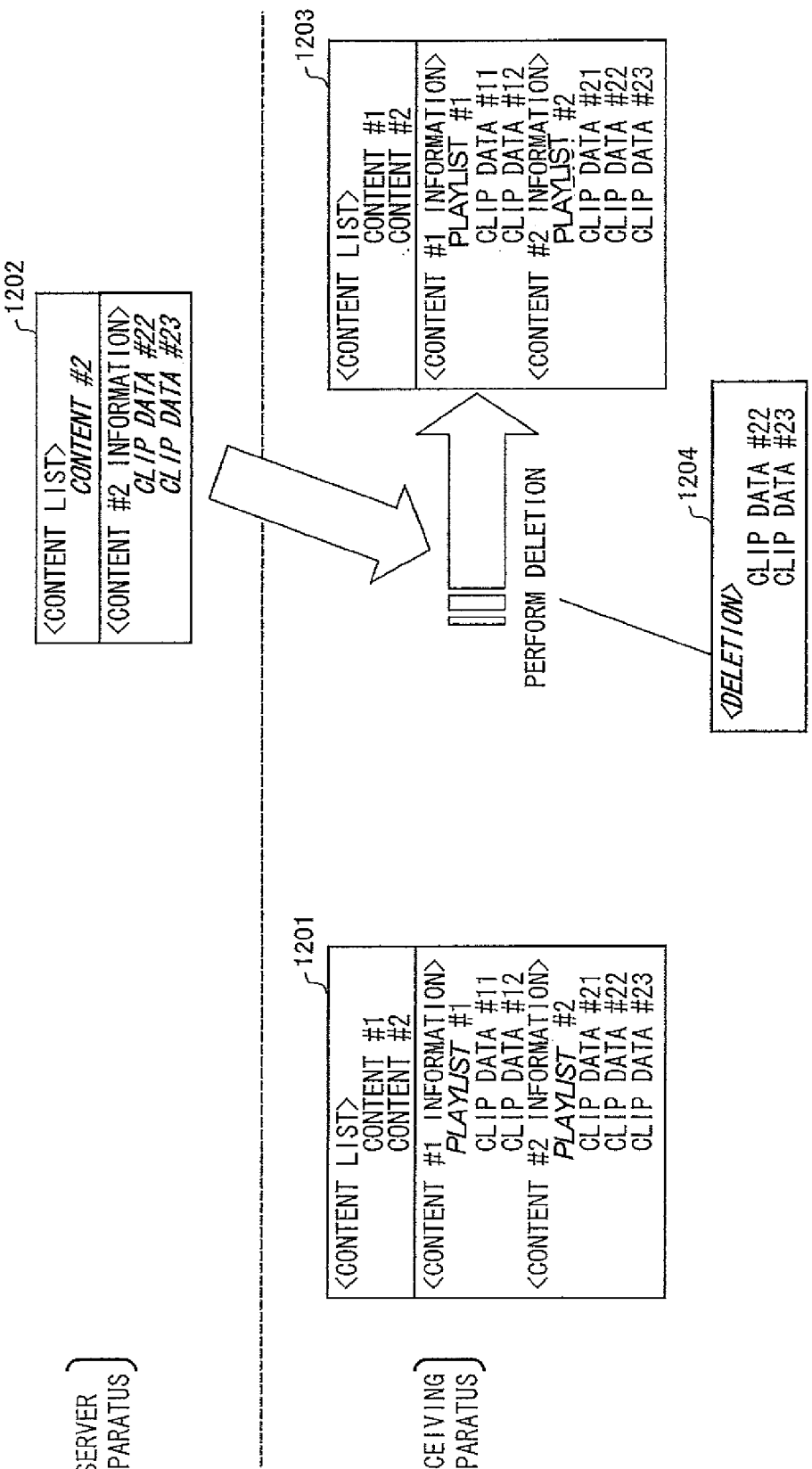
FIG. 13 is an explanatory diagram showing how the management information is updated in accordance with the process flow of the example of operation shown in FIG. 12.
Figure 14:
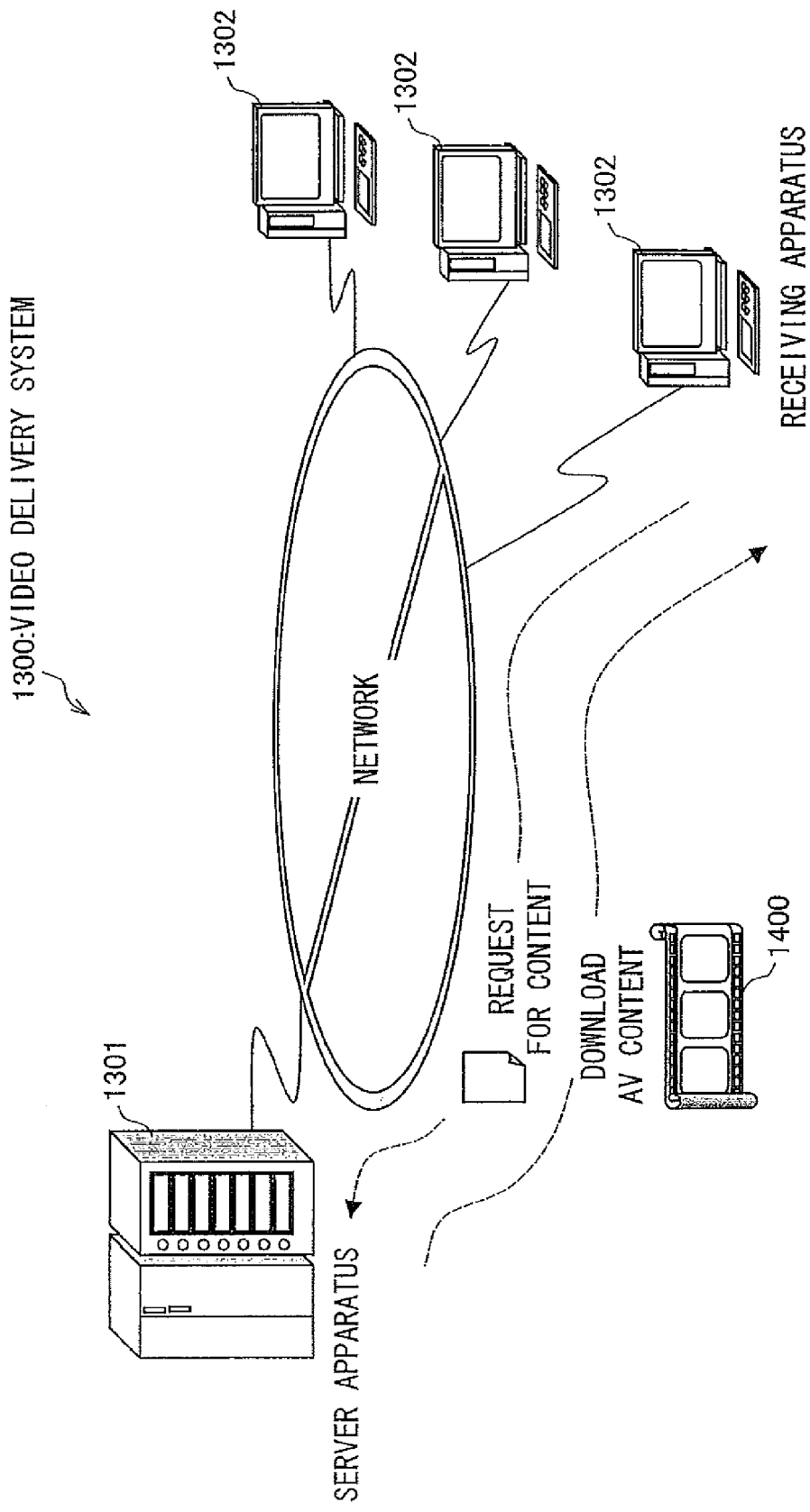
FIG. 14 is an explanatory diagram schematically showing a conventional video delivery system.

Referring to FIGS. 12 and 13, the functions of each of the components of the data management system 30 will be explained along with a specific operation. FIG. 12 is a process flow diagram showing how the data management system 30 works when a content is newly downloaded into the receiving apparatus 20. FIG. 13 is an explanatory diagram showing how management information is updated on this occasion.

In the data management system 30, the server apparatus 10 receives no special request for a download, starts a download at its own timing (S31), and transmits download data (S33). This arrangement is useful in, when a delivered content is updated, automatically delivering data corresponding to the updated portion of the delivered content.

On this occasion, the difference management information generation section 1003 of the server apparatus 10 creates management information listing only information specifying content data that is to be transmitted (S32), and the management information is transmitted at the same time as the download is started (S33). On arrival at each receiving apparatus 20, the management information transmitted from the server apparatus 10 corresponds to difference information which is compared with management information by the receiving apparatus 20 and which specifies a file that is to be added, and therefore is herein referred to as "difference management information". Step S32 of generating the difference management information only needs to be carried out before the content data is downloaded. For example, the difference management information may be created before the download is started, stored in advance in the storage section 1002, sent when the download is started.

Next, upon receiving the difference management information from the server apparatus 10, the receiving apparatus 20 goes through the content of the difference management information, and decides whether or not to store therein the content data corresponding to the difference management information (S34). Specifically, the receiving apparatus 20 temporarily stores the received difference management information in a temporary region, shows the difference management information to the user via the UI 2004, and acquires a result of judgment as to whether or not the content data are stored. In cases where content data are always stored, Step S34 can be omitted.

In cases where the receiving apparatus decides, in Step S34, that the content data are stored, the receiving apparatus 20 stores the difference management information and the content data (if there are any content data sent simultaneously with the difference management information) in the storage section 2002 (S35). FIG. 12 shows a case where only the difference management information is sent first and all the content data (clip data) are sent later.

Next, in the receiving apparatus 20, the management information judgment and update section 2005 (i) compares (a) the management information currently stored in the receiving apparatus 20 with (b) the difference management information transmitted (and content data, if there are any content data sent simultaneously with the difference management information), and (ii) decides, from among the files already stored, a file that is to be deleted (delete file) (S36).

A delete file is decided in the following manner. First, the current management information is compared with the received difference management information, and files to be replaced are specified. Next, if the files thus specified include files sent simultaneously with the difference management information, the files are excluded from the files thus specified. The remaining files are treated as delete files.

The following explains operation of the management information judgment and update section 2005 with reference to FIG. 13. In FIG. 13, management information 1201 is an example of the management information currently stored in the receiving apparatus 20, and difference management information 1202 is an example of the difference management information that the receiving apparatus 20 received from the server apparatus 10.

In this example of operation, as shown in FIG. 12, it is assumed that there is no content data (playlist, clip data) newly transmitted at the same time as the difference management information 1202 is received and that clip data #22 and #23 concerning content #2 indicated by the difference management information 1202 are transmitted later.

The management information judgment and update section 2005 of the receiving apparatus 20 makes a comparison between the current management information 1201 and the difference management information 1202 transmitted from the server apparatus 10, thereby finding that the clip data #22 and #23 existing in the storage section 2002 can be replaced by the clip data #22 and #23 that are to be newly downloaded. Furthermore, from the fact that there is no clip data sent together with the difference management information 1202, the management information judgment and update section 2005 finds that the clip data #22 and #23 are transmitted later. Then, in accordance with these findings, the management information judgment and update section 2005 treats the existing clip data #22 and #23 as files that are to be deleted (S36), creates corresponding deletion information 1204, sends the deletion information 1204 to the deletion section 2006, and updates the management information to management information 1203 (S37).

Then, the management information judgment and update section 2005 stores the updated management information 1203 in the storage section 2002. In the example shown in FIG. 13, the management information 1201 and the management information 1203 have the same content. In such a case, the process of storing the management information again may be omitted.

Further, the deletion section 2006 deletes, in accordance with the deletion information 1204, the existing clip data #22 and #23 stored in the storage section 2002 (S38). Note that the update of management information (S37) and the deletion of delete files (S38) may be carried out in any order.

Further, FIG. 13 shows the deletion information 1204 in independent form. However, an arrangement may be such that: at the point of time when the management information judgment and update section 2005 decides a delete file (S36), the management information judgment and update section 2005 sequentially sends, to the deletion section 2006, information corresponding the delete file, so that the deletion section 2006 immediately deletes the delete file.

Thereafter, at the point of time when the receiving apparatus 20 stores, in the storage section 2002, the new clip data #22 and #23 transmitted from the server apparatus 10 (S39), the download is finished.

As described above, in the data management system 30, a file (clip data) that may be wrongly referred to is specified by using management information and difference management information, and the file thus specified is deleted by the receiving apparatus 20. With this, an existing file can be deleted at the same time as a download is performed. This makes it possible to prevent wrong reproduction from being performed by wrongly referring to the existing file. Furthermore, in the data management system 30, the receiving apparatus 20 updates management information all by itself. This makes it possible to build a data management system in which the burden on the server apparatus 10 is reduced.

Further, instead of sending, as difference management information, management information specifying a content that is to be sent from the server apparatus 10, new management information obtained by adding an updated portion of the original management information to the original management information may be generated and sent as difference management information. In this case, the server apparatus 10 needs to receive management information from the receiving apparatus 20 as with Embodiments 1 and 2, but does not need to judge a file that is to be deleted by the receiving apparatus 20.

Specifically, in the server apparatus 10, the difference management information generation section 1003 adds, to the original management information, an update corresponding to the content that is to be sent, and generates difference management information. Then, when the receiving apparatus 20 receives the difference management information, the management information judgment and update section 2005 compares the difference management information with the original management information and specifies a file that is to be deleted. Then, the deletion section 2004 deletes the file thus specified. On this occasion, the file specified as a file that is to be deleted is a file which is contained in the original management information and which is not contained in the new management information (received difference management information), i.e., a file that becomes unnecessary in the receiving apparatus 20 after update. Therefore, this process makes it possible to delete clip data and the like no longer referred to by any playlist. This makes it possible to effectively use a recording region of the storage section 2002 of the receiving apparatus 20. Note that: since the difference management information received by the receiving apparatus 20 represents a file storage condition of the storage section 2002 which file storage condition is obtained after the deletion of the file, the management information judgment and update section 2005 replaces the original management information with the difference management information.

The above description will be further fully explained in Embodiment 4.

Embodiment 4

Another embodiment of the present invention will be described below with reference to FIGS. 16 through 18. For convenience of explanation, components having the same functions as those described in Embodiments 1, 2, and 3 are given the same referential marks, and will not be explained. Further, unless otherwise noted, the terms whose definitions are given in Embodiments 1, 2, and 3 are used on the basis of the same definitions in the present embodiment.

FIG. 16 is a functional block diagram showing a structure of a data management system 30' according to Embodiment 4.

The data management system 30' includes: a server apparatus 10', which stores and sends out a plurality of AV contents; and a receiving apparatus 20', which receives, stores, and reproduces an AV content sent from the server apparatus 10'.

As described above, in the data management systems 3 and 3' (see FIGS. 1 and 7) according to Embodiments 1 and 2, the server apparatus 1 both (i) updates management information concerning files stored in the receiving apparatuses 2 and 2' and (ii) decides deletion information designating a file that is to be deleted. Further, in the data management system 30 (see FIG. 11) according to Embodiment 3, the receiving apparatus 20 both (a) updates the management information concerning the stored files and (b) decides the delete file. On the other hand, in the data management system 30' according to Embodiment 4, while the server apparatus 10' updates management information concerning a file stored in the receiving apparatus 20', the receiving apparatus 20' decides a file that is to be deleted by the receiving apparatus 20'.

The server apparatus 10' includes an input-output control section 1001', a storage section 1002, a management information judgment section 103, and a management information update section (management information transmitting means) 1604. The receiving apparatus 20' includes an input-output control section 2001', a storage section 2002, a display section 2003, a UI (user interface) 2004 (included in the display section 2003), a deletion judgment section (deletion judgment means) 2605, a deletion section 2006, a reproduction section 2007, and a management information transmitting and receiving section 2008. Among these, the management information judgment section 103 of the server apparatus 10' is identical to that provided in the data management system 3 and 3' (see FIGS. 1 and 7) according to Embodiments 1 and 2.

A comparison between FIG. 11 (which is a functional block diagram in Embodiment 3) and FIG. 16 shows that the server apparatus 10' includes the management information judgment section 103 and the management information update section 1604 instead of the difference management information generation section 1003 and that the receiving apparatus 20' includes the deletion judgment section 2605 and the management information transmitting and receiving section 2008 instead of the management information judgment and update section 2005.

Referring to FIGS. 17 and 18, the functions of each of the components of the data management system 30' will be explained below along with a specific operation. FIG. 17 is a process flow diagram showing how the data management system 30' works when a content is newly downloaded into the receiving apparatus 20'. FIG. 18 is an explanatory diagram showing how management information is updated on this occasion. In the following, the explanations already given in Embodiment 1, 2, or 3 are appropriately omitted.

In the data management system 30', at the start of a download (S41), the management information transmitting and receiving section 2008 of the receiving apparatus 20' sends management information 301 to the server apparatus 10'. In the server apparatus 10, the management information judgment section 103 judges, in accordance with the management information 301 thus received, contents that can be downloaded next into the receiving apparatus 20' (S42). The server apparatus 10' presents, to the receiving apparatus 20', information on contents serving as download candidates. The receiving apparatus 20' uses the UI 2004 to show the user the information on contents serving as download candidates. From the candidates thus presented, the user selects a content that is to be downloaded next. The receiving apparatus 20' acquires designation information specifying the content thus selected by the user (S43). Then, the receiving apparatus 20' sends the designation information to the server apparatus 10'. The operations thus far carried out are identical to Steps S11 to S13 of FIG. 3 in Embodiment 1 or Steps S21 to S23 of FIG. 5 in Embodiment 1.

Next, in the server apparatus 10', the management information update section 1604 adds, to the original management information 301, the information concerning the content instructed to be newly downloaded, thereby generating management information 1802 corresponding to data files that are to be stored in the receiving apparatus 20' after the download (S44). In the case shown in FIG. 18, the new management information 1802 is generated from the management information 1801 (copy of the management information 301) by replacing (i) the information on the content #2 instructed to be downloaded with (ii) the information on the after-downloaded content #2. Then, the updated management information 1802 is sent to the receiving apparatus 20' via the input-output control sections 1001' and 2001'. Further, a file corresponding to the content that instructed to be downloaded is sent to the receiving apparatus 20' via the input-output control section 1001' and 2001' (S45).

The example shown in FIGS. 17 and 18 shows a case where the content #2, already stored in the receiving apparatus 20', which includes a playlist #2 and three clip data #21, #22, and #23 is replaced by a new content #2 including a playlist #2 and two clip data #21 and #22. Further, in the example shown in FIGS. 17 and 18, it is assumed that the new clip data #21 and #22 are sent simultaneously with the management information 1802 and the playlist #2. The present invention is not limited to this. For example, the clip data may be transmitted later as with Embodiment 1, 2, or 3.

Next, the receiving apparatus 20' stores the management information 1802 and the content (playlist #2, clip data #21 and #22) in the storage section 2002 (S46). On this occasion, the management information 301 and the content that were previously stored are overwritten so as to be updated. That is, the management information 1802 serves as new management information in the receiving apparatus 20'. Here, the receiving apparatus 20' separately retains in advance the previous management information 301, and disposes of the previous management information 301 after carrying out a process described below. Note that FIG. 17 does not show the retention and disposal of the original management information 301.

Next, the deletion judgment section 2605 makes a comparison between (i) the new management information 1802 thus received from the server apparatus 10' and (ii) the original management information 301 thus separately retained, and checks whether or not there is a file caused by the download to be no longer required. Then, the deletion judgment section 2605 outputs, as deletion information 1803, information specifying the file (clip data #23 in FIG. 18) judged to be no longer required (S47).

The term "file no longer required" refers to (i) clip data caused by the execution of a download to be no longer referred to by any playlist, (ii) a playlist or clip data having dropped out of use due to the deletion of a content. Basically, the deletion of an unnecessary file is carried out mainly by the receiving apparatus 20' for the purpose of, for example, ensuring a recording region. However, see a case where a provider (producer) of a content intentionally suspends the provision of the content because of the expiration of the duration of service or for other reasons. In this case, the server apparatus 10' is required to mainly manage the deletion of the content. For this purpose, the server apparatus 10' uses the management information update section 1604 to generate management information reflecting the deletion of the content, and causes the receiving apparatus 20' to delete the content in accordance with the management information. Therefore, in such a case, the receiving apparatus 20' is required to have the following arrangement (deletion judgment section 2605, deletion section 2006) for deleting the content.

Next, the deletion section 2006 deletes the file (clip data #23 in FIG. 18) in accordance with the deletion information 1803 outputted from the deletion judgment section 2605 (S48). Thereafter, the download is finished.

Note that the deletion judgment section 2605 and the deletion section 2006 are not necessarily separated from each other. The receiving apparatus 20' may be arranged such that: as soon as the deletion judgment section 2605 judges a file as unnecessary, the deletion section 2006 deletes the file without the deletion information 1803.

As described above, in the data management system 30' according to the present embodiment, the server apparatus 10' carries out a process of updating management information while the receiving apparatus 20' carries out a process of judging a delete file. With this arrangement, the server apparatus 10' only needs to have a low throughput to manage what is stored in the receiving apparatus 20'. Further, the receiving apparatus 20' deletes an unnecessary file, so that a recording region in the receiving apparatus 20' can be effectively used.

Embodiment 5

Another embodiment of the present invention will be described below with reference to FIGS. 19 through 22. For convenience of explanation, components having the same functions as those described in Embodiments 1 through 4 are given the same referential marks, and will not be explained. Further, unless otherwise noted, the terms whose definitions are given in Embodiments 1 through 4 are used on the basis of the same definitions in the present embodiment.

FIG. 19 is a functional block diagram showing a structure of a data management system 3" according to Embodiment 5. The data management system 3" includes: a server apparatus 1", which stores and sends out a large number of AV contents; and a receiving apparatus 2", which receives, stores, and reproduces an AV content sent from the server apparatus 1".

The data management system 3" is arranged in much the same way as is the data management system 3 (see FIG. 1) according to Embodiment 1. However, the data management system 3" includes functional blocks different from those of the data management system 3. Specifically, the data management system 3" includes a management information judgment section 103", a deletion section (file management means) 205", a management information update section 206", and a management information transmitting and receiving section (deletion history information transmitting means) 208" instead of the management information judgment section (file selection means) 103, the deletion section 205, the management information update section 206, and the management information transmitting and receiving section 208. For this reason, the following explains operation of the data management system 3" according to Embodiment 5 with emphasis on the differences between the data management system 3" of Embodiment 5 and the data management system 3 of Embodiment 1.

In Embodiment 1, the management information 301 is information listing contents having been downloaded from the server apparatus 1 and currently stored in the receiving apparatus 2. Then, the management information 301 recorded in the receiving apparatus 2 is sent to the server apparatus 1. In the server apparatus 1, the management information judgment section 103 makes a comparison between (i) transmittable contents stored in the server apparatus 1 and (ii) the contents described in the management information 301 and currently stored in the receiving apparatus 2, and decides candidate contents that can be downloaded next into the receiving apparatus 2. Then, information on the candidate contents thus decided is sent to the receiving apparatus 2, and is shown to the user.

Here, the management information judgment section 103 of the server apparatus 1 carries out an operation of searching for a content that is not currently stored in the receiving apparatus 2. However, examples of a condition in which the receiving apparatus 2 does not store a content include a case where the content has not been downloaded and a case where the content has been deleted as unnecessary after the user downloaded and viewed the content. In the latter case, the content is not currently stored in the receiving apparatus 2. However, since the content was downloaded and stored in the past and has already been judged as unnecessary by the user, the user does not want the content to be presented as a download candidate.

For this reason, as shown in FIG. 20, Embodiment 5 uses management information 2201 containing a history of a content deleted in the past. As compared with the management information 301 used in Embodiments 1 to 4 described above, the management information 2201 is characterized by containing deletion history information 2201a on the content deleted in the past. Note that an arrangement in which file deletion history information of the present embodiment is transmitted from a receiving apparatus to a server apparatus can be applied to Embodiments 1 to 4 described above. That is, the management information transmitting and receiving sections 208 and 2008 (see FIGS. 1, 7, and 16) may include a function of transmitting deletion history information to a server apparatus. Further, the management information judgment section 103 (see FIGS. 1, 7, and 16) and the difference management information generation section 1003 (see FIG. 11) may include a function of selecting a data file that is to be transmitted to a receiving apparatus by the difference management information generation section 1003 (see FIG. 11).

Figure 21:
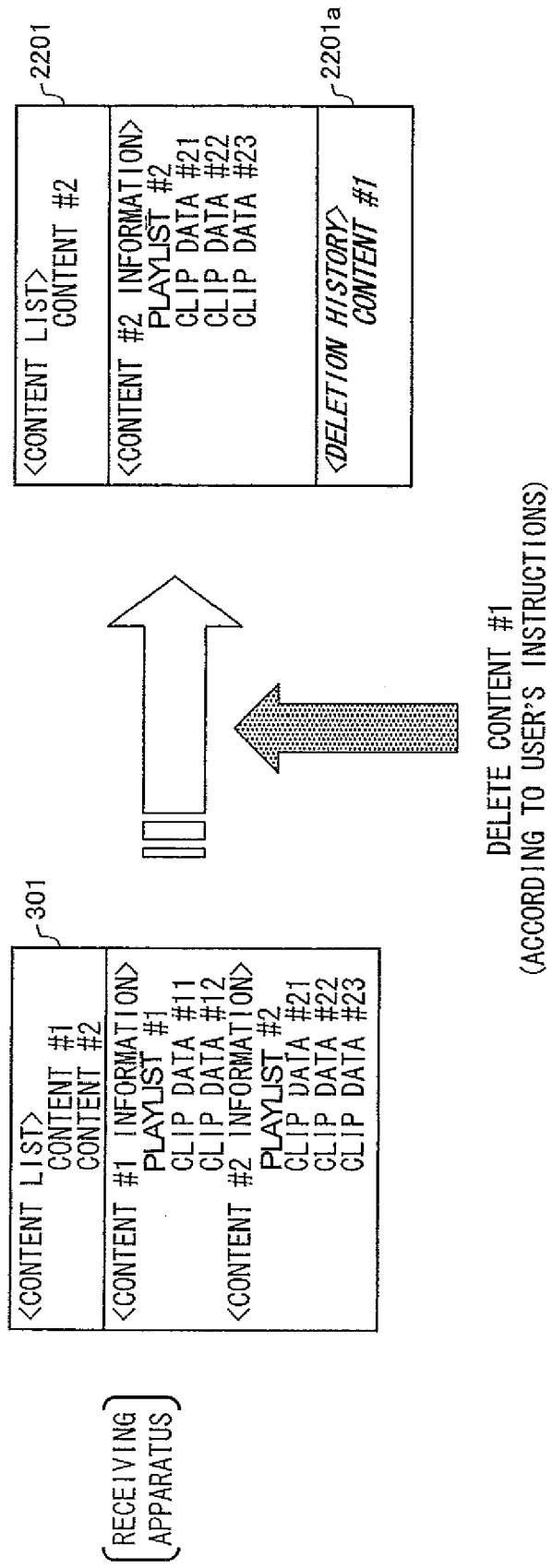
FIG. 21 is an explanatory diagram showing how the management information is updated in the data management system shown in FIG. 19.

Referring to FIGS. 21 and 22, the functions of each the components of the data management system 3" shown in FIG. 19 will be explained along with a specific operation. FIG. 21 is an explanatory diagram showing how management information is updated when the user deletes a content from the receiving apparatus 2".

First, it is assumed that the receiving apparatus 2" stores two contents #1 and #2 already downloaded thereinto. On this occasion, the receiving apparatus 2" stores management information 301 shown in FIG. 21. Under these circumstances, the user judges the content #1 as unnecessary and gives an instruction to delete the content #1.

As with the deletion section 205 (see Embodiment 1), the deletion section 205" of the receiving apparatus 2" has a function of, in accordance with deletion information contained in management information, deleting a file of a content corresponding to the deletion information. In addition, the deletion section 205" has a function of deleting the content in response to the user's instructions.

Further, as with the management information update section 206 (see Embodiment 1), the management information update section 206" has a function of, after the content has been deleted, deleting the deletion information contained in the management information. In addition, the management information update section 206" has a function of generating new management information by adding, to the management information, information (deletion history information) on the content deleted in response to the user's instructions.

As shown in FIG. 21, when the content #1 has been deleted from the receiving apparatus 2" in response to the user's instructions, the management information 301 stored in the receiving apparatus 2" is updated to the management information 2201. Specifically, the management information 2201 is obtained by adding, to the management information 301, the deletion history information 2201a listing the content #1 deleted.

The following explains a case where the download of a new content is started in the state where the management information 2201 is stored in the receiving apparatus 2". FIG. 22 is a process flow diagram showing how the data management system 3" works when a new content is downloaded. However, Step S54 and its subsequent steps are not shown in FIG. 22, because they are identical in content to Steps S14 and S24 and their subsequent steps of the process flows (see FIGS. 3 and 5) of Embodiment 1 and Step 44 and its subsequent steps of the process flow (see FIG. 17) of Embodiment 4.

First, at the start of a download (S51), the management information transmitting and receiving section (deletion history information transmitting means) 2008" of the receiving apparatus 2" sends, to the server apparatus 1", the management information 2201 containing the deletion history information 2201a. The server apparatus 1" receives the management information 2201, and the management information judgment section 103" judges, in accordance with the management information thus received, contents that can be downloaded next into the receiving apparatus 2" (S52). On this occasion, the management information judgment section 103" refers to the deletion history information 2201a contained in the management information 2201. If the downloadable contents include a content that was already deleted from the receiving apparatus 2" in the past, the management information judgment section 103" excludes the content from candidates for the next download. Then, the management information judgment section 103" transmits, to the receiving apparatus 2", information listing contents serving as download candidates. Thereafter, in the receiving apparatus 2", the display section 2003 shows the received content presentation information indicating the contents serving as download candidates. Then, the user uses the UI 2004 to carry out an operation of designating, from the content presentation information shown by the display section 2003, a content that is to be downloaded. In accordance with the user's operation, the receiving apparatus 2" generates content designation information designating the content that is to be downloaded, and transmits the content designation information to the server apparatus 1" (S53).

Alternatively, the management information judgment section 103" refers to the deletion history information 2201a contained in the management information 2201. If the downloadable contents include a content that was already deleted from the receiving apparatus 2" in the past, the management information judgment section 103" includes the content in candidates for the next download. However, the management information judgment section 103" may output the content presentation information containing instruction information instructing the receiving apparatus 2' to display the content separately from those contents which are not contained in the deletion history information 2201a.

In this case, the receiving apparatus 2" refers to the instruction information contained in the information indicating the contents serving as download candidates, and separately displays (i) a content deleted in the past and (ii) a content having not been deleted so far. Examples of how the separate display is carried out include (i) a method of changing the color and/or font of characters of text information indicating a content, (ii) a method of setting, in a highlighting frame, an image (thumbnail) indicating a content, and (iii) a method of displaying contents sorted into groups. However, the display may be carried out by any method other than these methods.

Alternatively, the management information judgment section 103" may only make a judgment as to downloadable contents as with the management information judgment section 103 of Embodiment 1. In this case, all the contents which have been judged as downloadable are presented as download candidate contents to the receiving apparatus 2". The receiving apparatus 2" refers to the deletion history information 2201a contained in the management information 2201, and sorts, into (i) a group of contents contained in the deletion history information 2201a and (ii) a group of contents not contained in the deletion history information 2201a, the candidates transmitted from the server apparatus 1". Then, the receiving apparatus 2" displays the groups. In such a case where only the receiving apparatus 2" refers to the deletion history information 2201a, the deletion history information 2201a does not need to be contained in the management information 2201, and may be stored and managed in the receiving apparatus 2" separately from the management information 2201.

Step S54 and its subsequent steps are identical to Steps S14 and S24 and their subsequent steps explained along with FIGS. 3 and 5 in Embodiment 1 and Step 44 and its subsequent explained along with FIG. 17 in Embodiment 4. The deletion history information 2201a is basically not deleted. However, for example, such a function may be added that the history information is set to have a period of validity and is deleted (reset) at the end of the period of validity. The setting of a period of validity (e.g., a setting as to whether or not a period of validity is set and a setting as to how long the period of validity is) may be executed for each content.

As the history information 2201a on the deleted content, the management information 2201 shown FIGS. 20 and 21 uses a list of the deleted content instead of a list of the deleted files. With this, as compared with a case where all the deleted files are left on a list, the history information is left with a small amount of data. It is possible to leave the deleted files' names on a list.

Further, there is a case where a single content has a plurality of versions in a time-series manner. In this case, version information may be recorded together with information indicating the content. With this, in cases where a server side has a version 1 of a content A, the version 1 of the content A is not presented as a download candidate to a user who viewed and deleted the version 1 of the content A in the past; however, in cases where the content A is updated to a version 2, the version 2 is added as a candidate. It is possible for the user to intentionally configure such a setting that the content A is not nominated as candidate regardless whether or not the version is updated.

The foregoing explanation assumes that a content deleted in the past is treated as a content that is not nominated as download candidate. However, the present invention is not limited to this. The history information 2201a can be used to designate a content that the user judged as especially unnecessary. That is, the history information 2201a can be used not only as history information on a deletion made in the past but also as information representing a content that the user judged as unnecessary in the past. This allows the user to exclude in advance an unnecessary content from download contents that are to be presented by the server apparatus 1.

A data management system of the present invention may be arranged such that: when a content is downloaded from a server apparatus into a receiving apparatus, the server apparatus specifies a file (clip data) which is contained in a content file already stored in the receiving apparatus and which may be wrongly referred to, generates deletion information, and transmits the deletion information to the receiving apparatus together with management information; and the receiving apparatus deletes, in accordance with the deletion information, the file already stored therein.

With this, an existing file is deleted at the same time as a new file is downloaded. This makes it possible to prevent wrong reproduction from being performed by wrongly referring to the existing file.

A data management system of the present invention may be a data management system including one or more server apparatuses and one or more receiving apparatuses, between the one or more server apparatuses and the one or more receiving apparatuses, content data and management information indicating content data already stored in the one or more receiving apparatuses being exchanged, the one or more server apparatuses including (i) means for deciding content data that is to be deleted from among the content data already stored in the receiving apparatus and (ii) means for transmitting, to the one or more receiving apparatuses, deletion information indicating the content data thus decided, the one or more receiving apparatuses including means for deleting the content data in accordance with the deletion information.

With this, an existing file is deleted before a new file is downloaded. This makes it possible to prevent wrong reproduction from being performed by wrongly referring to the existing file.

Furthermore, the data management system may be arranged such that: the deletion information is contained in the management information, and is sent from the sever apparatus to the receiving apparatus.

With this, deletion information and management information can be treated together, so that management can be easily performed.

Further, a data management system of the present invention may be a data management system including one or more server apparatuses and one or more receiving apparatuses, the one or more server apparatuses including (i) means for generating first management information indicating content data that are to be transmitted and (ii) means for transmitting the first management information to the one or more receiving apparatuses, the one or more receiving apparatuses including (a) means for retaining second management information indicating content data already stored in the receiving apparatus and for deciding, in accordance with the first management information and the second management information, content data that are to be deleted from among the content data already stored in the one or more receiving apparatuses and (b) means for deleting the content data thus decided.

With this, an existing file is deleted before a new file is downloaded. This makes it possible to prevent wrong reproduction from being performed by wrongly referring to the existing file.

Finally, each of the blocks of the server apparatuses 1, 1", 10, and 10' and receiving apparatuses 2, 2", 20, and 20', especially, each of the management information judgment sections 103 and 103", the deletion information decision section 104, the management information update sections 105 and 1604, the difference management information generating section 1003, the deletion sections 205 and 205", the management information update sections 206 and 206", the reproduction sections 207 and 207', the file management section 205', the management information judgment and update section 2005, the deletion section 2006, the reproduction section 2007, and the deletion judgment section 2605 may be constituted by hardware logic, or by software with the use of a CPU as follows.

That is, each of the server apparatuses 1, 1", 10, and 10' and the receiving apparatuses 2, 2", 20, and 20' has: (i) the CPU (central processing unit) for executing an instruction of control program realizing various functions; (ii) a ROM (read only memory) storing the program; (iii) a RAM (random access memory) for expanding the program; (iv) a storage device (storage medium) such as a memory storing the program and various data; and (v) the like. The object of the present invention also can be achieved by (i) providing, for each of the server apparatuses 1, 1", 10, and 10' and the receiving apparatuses 2, 2", 20, and 20', a storage medium storing, in a computer readable manner, a program code (executable program; intermediate code; source program) of the control program for the present system, and (ii) causing a computer (CPU or MPU) to read and execute the program code stored in the storage medium, the program code being the software realizing the aforementioned functions.

Examples of the storage medium are: (i) tapes such as a magnetic tape and a cassette tape; (ii) magnetic disks such as a Floppy® disk and a hard disk; (iii) optical disks such as a compact disk read only memory (CD-ROM), a magnetic optical disk (MO), a mini disk (MD), a digital video disk (DVD), and a CD-Rewritable (CD-R); (iv) cards such as an IC card (inclusive of a memory card) and an optical card; and (v) semiconductor memories such as a mask ROM, an EPROM (electrically programmable read only memory), an EEPROM (electrically erasable programmable read only memory), and a flash ROM.

Further, each of the server apparatuses 1, 1", 10, and 10' and the receiving apparatuses 2, 2", 20, and 20' may be connectable to the communication network, and the program code may be supplied via the communication network. The communication network is not particularly limited. Specific examples thereof are: the Internet, Intranet, Extranet, LAN (local area network), ISDN (integrated services digital network), VAN (value added network), CATV (cable TV) communication network, virtual private network, telephone network, mobile communication network, satellite communication network, and the like. Further, the transmission medium constituting the communication network is not particularly limited. Specific examples thereof are: (i) a wired channel using an IEEE 1394, a USB (universal serial bus), a power-line communication, a cable TV line, a telephone line, an ADSL line, or the like; or (ii) a wireless communication using IrDA, infrared rays used for a remote controller, Bluetooth®, IEEE 802.11, HDR (High Data Rate), a mobile phone network, a satellite connection, a terrestrial digital network, or the like. Note that, the present invention can be realized by (i) a carrier wave realized by electronic transmission of the program code, or (ii) a form of a series of data signals.

All the embodiments disclosed herein are illustrative in all respects, and should not be considered as limitative. The present invention is not limited to the description of the embodiments above, but may be altered by a skilled person within the scope of the claims. An embodiment based on a proper combination of technical means disclosed in different embodiments is encompassed in the technical scope of the present invention.

As described above, a data management system of the present invention is a data management system, including: at least one receiving apparatus; and at least one server apparatus for transmitting, to the receiving apparatus, a file group including a plurality of data files, the receiving apparatus including a storage section for storing the plurality of data files, the server apparatus including: file decision means for deciding a data file from among first data files which have been already stored in the storage section, the data file to be decided being restricted or prohibited from being used in the receiving apparatus when second data files constituting a file group that is to be newly transmitted to the receiving apparatus are stored in the storage section; and management information transmitting means for transmitting, to the receiving apparatus, file specifying information for specifying the data file decided by the file decision means, the receiving apparatus receiving the file group constituted by the second data files, the receiving apparatus, further including: file management means for restricting use of or deleting, in accordance with the file specifying information received from the server apparatus, the data file already stored in the storage section.

Further, a data management method of the present invention is a data management method for managing data in a data management system including at least one receiving apparatus and at least one server apparatus for transmitting, to the receiving apparatus, a file group including a plurality of data files, the data management method, including: a file decision step of causing the server apparatus to decide a data file from among first data files which have been already stored in a storage section of the receiving apparatus, the data file to be decided being restricted or prohibited from being used in the receiving apparatus when second data files constituting a file group that is to be newly transmitted to the receiving apparatus are stored in the storage section; a management information transmitting step of causing the server apparatus to transmit, to the receiving apparatus, file specifying information for specifying the data file thus decided, the receiving apparatus receiving the file group constituted by the second data files; and a file management step of causing the receiving apparatus to restrict use of or delete, in accordance with the file specifying information received from the server apparatus, the data file already stored in the storage section.

Further, a server apparatus of the present invention is a server apparatus for transmitting, to at least one receiving apparatus, a file group including a plurality of data files, the server apparatus, including: file decision means for deciding a data file from among first data files which have been already stored in a storage section of the receiving apparatus, the data file to be decided being restricted or prohibited from being used in the receiving apparatus when second data files constituting a file group that is to be newly transmitted to the receiving apparatus are stored in the storage section; management information transmitting means for transmitting, to the receiving apparatus, file specifying information for specifying the data file decided by the file decision means, the receiving apparatus receiving the file group constituted by the second data files.

Further, a receiving apparatus of the present invention is a receiving apparatus for receiving, from at least one server apparatus, a file group including a plurality of data files, the receiving apparatus, including: a storage section for storing the plurality of data files; and file management means for restricting use of or deleting a data file which has already been stored in the storage section and which is specified by file specifying information received from the server apparatus.

According to the foregoing arrangement, when a server apparatus transmits, to a receiving apparatus in which a file group including first data files has been already stored in a storage section thereof, a new file group including second data files, the server apparatus transmits, to the receiving apparatus, file specifying information specifying a first data file which is to be prohibited or restricted from being used in the receiving apparatus. Moreover, in accordance with the file specifying information received from the server apparatus, the receiving apparatus restricts use of or deletes the first data file already stored in the storage section.

With this, when a new version of a file group is downloaded into a receiving apparatus in which an older version of the file group is stored, a data file which constitutes the older version of the file group and which is replaced by a data file constituting the new version of the file group can be deleted for example. Therefore, the data file which constitutes the older version of the file group can be prevented from being wrongly used.

For example, in cases where constituent files, i.e., clip data of an AV content are sequentially downloaded and stored, an instruction to reproduce a playlist referring to the clip data may be given when new clip data have not been downloaded (are being downloaded) or when the clip data have failed to be completely downloaded. Even in this case, reproduction different from that originally expected is prevented from being performed by referring to another file that was downloaded in the past.

As described above, according to the foregoing arrangement, in a data management system in which a server apparatus storing a plurality of data files appropriately delivers the plurality of data files to a receiving apparatus, data management in the receiving apparatus can be effectively performed.

Furthermore, the data management system of the present invention may be arranged such that the management information transmitting means transmits, to the receiving apparatus, management information including (i) the file specifying information and (ii) information specifying the second data files constituting the file group.

According to the foregoing arrangement, file specifying information specifying a file that is to be for example deleted from a receiving apparatus can be transmitted from a server apparatus to the receiving apparatus together with information specifying a data file that is to be transmitted. Therefore, data can be transmitted collectively, so that the transmission can be carried out with a simple process.

Furthermore, the data management system of the present invention may be arranged such that: the receiving apparatus include history information transmitting means for transmitting, to the server apparatus, deletion history information specifying a data file deleted from the storage section; and the server apparatus includes file selection means for selecting the second data files constituting a file group in accordance with the deletion history information received from the receiving apparatus, the second data files to be selected being able to be newly transmitted to the receiving apparatus.

Here, examples of a condition in which a receiving apparatus does not store a content include a case where the content has not been downloaded and a case where the content has been deleted as unnecessary after the user downloaded and viewed the content. In the latter case, the content is not currently stored in the receiving apparatus. However, since the content was downloaded and stored in the past and has already been judged as unnecessary by the user, the user does not want the content to be presented as a download candidate.

In light of this, according to the foregoing arrangement, a server apparatus is further able to specify, in accordance with deletion history information received from the receiving apparatus, data files that were deleted form a storage section of the receiving apparatus in the past. Moreover, in consideration of the deleted data files, the server apparatus can select the second data files that can be newly transmitted to the receiving apparatus. For example, a data file which has been judged as unnecessary by the user can be excluded from the second data files that are to be newly transmitted to the receiving apparatus.

Further, a data management system of the present invention is a data management system, including: at least one receiving apparatus; and at least one server apparatus for transmitting, to the receiving apparatus, a file group including a plurality of data files, the receiving apparatus including a storage section for storing the plurality of data files, the server apparatus including management information transmitting means for transmitting, to the receiving apparatus, management information specifying second data files constituting a file group that is to be newly transmitted to the receiving apparatus, the receiving apparatus receiving the file group, the receiving apparatus, further including: file decision means for deciding, in accordance with the management information received from the server apparatus, a data file from among first data files which have been already stored in the storage section, the data file to be decided being restricted or prohibited from being used in the receiving apparatus when the second data files constituting the file group that is to be newly received from the server apparatus are stored in the storage section; and file management means for restricting use of the data file decided by the file decision means, or for deleting the data file from the storage section.

Further, a data management method of the present invention is a data management method for managing data in a data management system including at least one receiving apparatus and at least one server apparatus for transmitting, to the receiving apparatus, a file group including a plurality of data files, the data management method, including: a management information transmitting step of causing the server apparatus to transmit, to the receiving apparatus, management information specifying second data files constituting a file group that is to be newly transmitted to the receiving apparatus, the receiving apparatus receiving the file group; a file decision step of causing the receiving apparatus to decide, in accordance with the management information received from the server apparatus, a data file from among first data files which have been already stored in a storage section of the receiving apparatus, the data file to be decided being restricted or prohibited from being used in the receiving apparatus when the second data files constituting the file group that is to be newly received from the receiving apparatus are stored in the storage section; and a file management step of causing the receiving apparatus to restrict use of the data file thus decided, or to delete the data file from the storage section.

Further, a server apparatus of the present invention is a server apparatus for transmitting, to at least one receiving apparatus, a file group including a plurality of data files, the server apparatus, including: management information transmitting means for transmitting, to the receiving apparatus, management information specifying second data files constituting a file group that is to be newly transmitted to the receiving apparatus, the receiving apparatus receiving the file group.

Further, a receiving apparatus of the present invention is a receiving apparatus for receiving, from at least one server apparatus, a file group including a plurality of data files, the receiving apparatus, including: a storage section for storing the plurality of data files; file decision means for (i) receiving, from the server apparatus, management information specifying second data files constituting a file group that is to be newly received from the server apparatus, and for (ii) deciding, in accordance with the management information, a data file from among first data files which have been already stored in the storage section, the data file to be decided being restricted or prohibited from being used in the receiving apparatus when the second data files are stored in the storage section; and file management means for restricting use of the data file decided by the file decision means, or for deleting the data file from the storage section.

According to the foregoing arrangement, when a server apparatus transmits, to a receiving apparatus in which a file group including first data files has been already stored in a storage section thereof, a new file group including second data files, the server apparatus transmits management information specifying a second data file that is to be newly transmitted to the receiving apparatus. Then, in accordance with the management information received from the server apparatus, the receiving apparatus decides a first data file from among the first data files already stored in the storage section, the first data file to be decided being restricted or prohibited from being used in the receiving apparatus. Moreover, the receiving apparatus restricts use of or deletes the first data file. With this, when a new version of a file group is downloaded into a receiving apparatus in which an older version of the file group is stored, a data file which constitutes the older version of the file group and which is replaced by a data file constituting the new version of the file group can be deleted for example. Therefore, the data file which constitutes the older version of the file group can be prevented from being wrongly used.

For example, in cases where constituent files, i.e., clip data of an AV content are sequentially downloaded and stored, an instruction to reproduce a playlist referring to the clip data may be given when new clip data have not been downloaded (are being downloaded) or when the clip data have failed to be completely downloaded. Even in this case, reproduction different from that originally expected is prevented from being performed by referring to another file that was downloaded in the past.

As described above, according to the foregoing arrangement, in a data management system in which a server apparatus storing a plurality of data files appropriately delivers the plurality of data files to a receiving apparatus, data management in the receiving apparatus can be effectively performed.

Furthermore, the data management system of the present invention may be arranged such that: the receiving apparatus includes history information transmitting means for transmitting, to the server apparatus, deletion history information specifying a data file deleted from the storage section; and the server apparatus includes file selection means for selecting the second data files constituting a file group in accordance with the deletion history information received from the receiving apparatus, the second data files to be selected being able to be newly transmitted to the receiving apparatus.

Here, examples of a condition in which a receiving apparatus does not store a content include a case where the content has not been downloaded and a case where the content has been deleted as unnecessary after the user downloaded and viewed the content. In the latter case, the content is not currently stored in the receiving apparatus. However, since the content was downloaded and stored in the past and has already been judged as unnecessary by the user, the user does not want the content to be presented as a download candidate.

In light of this, according to the foregoing arrangement, a server apparatus is further able to specify, in accordance with deletion history information received from the receiving apparatus, data files that were deleted form a storage section of the receiving apparatus in the past. Moreover, in consideration of the deleted data files, the server apparatus can select the second data files that can be newly transmitted to the receiving apparatus. For example, a data file which has been judged as unnecessary by the user can be excluded from the second data files that are to be newly transmitted to the receiving apparatus.

Note that each of the server apparatus and the receiving apparatus may be realized by a computer. In this case, (i) a control program for realizing each of the server apparatus and the receiving apparatus by a computer by operating the computer as each of the means and (ii) a computer-readable recording medium in which the control program is recorded are also encompassed in the scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

According to the present invention, in a data management system including a server apparatus having a function of storing and appropriately delivering a data file and a receiving apparatus having a function of selectively receiving data from the server apparatus, management can be performed so that a data file already stored in the receiving apparatus is not wrongly referred to. Therefore, the present invention is suitable, for example, for a video delivery system in which a plurality of AV contents are delivered on demand.

The invention claimed is:

1. A server apparatus operably connected to at least one receiving apparatus, the server apparatus comprising:
   at least a central processing unit for executing instructions of a control program, and a computer-readable storage medium including memory for storing the control program, the server apparatus further comprising:
   file decision means for deciding a first data file from among a plurality of data files which have been already stored in a storage section of the receiving apparatus, the first data file to be decided being deleted or restricted from use in the receiving apparatus when a second data file that is to be newly transmitted to the receiving apparatus is stored in the storage section; and
   management information transmitting means for transmitting, to the receiving apparatus, file specifying information for specifying the first data file decided by the file decision means as being subject to deletion or restriction from use,
   the receiving apparatus receiving the second data file.

2. The server apparatus as set forth in claim 1, wherein the management information transmitting means transmits, to the receiving apparatus, management information including (i) the file specifying information and (ii) information specifying the second data file.

3. The server apparatus as set forth in claim 1, further comprising:
   file selection means for selecting the second data file in accordance with deletion history information received from the receiving apparatus, the deletion history information specifying the first data file deleted from the storage section, wherein the second data file is newly transmitted to the receiving apparatus.

4. A data management system, comprising:
   the server apparatus as set forth in claim 1; and
   the receiving apparatus for receiving, from the server apparatus, the second data file, the receiving apparatus comprising:
   a receiving apparatus storage section for storing the plurality of data files; and
   file management means for restricting use of or deleting the first data file which has already been stored in the receiving apparatus storage section and which is specified by file specifying information received from the server apparatus, wherein the file specifying information is for specifying the data file being deleted or restricted from use in the receiving apparatus.

5. The data management system as set forth in claim 4, wherein the server apparatus further comprises file selection means for selecting the second data file in accordance with deletion history information received from the receiving apparatus, the deletion history information specifying the first data file deleted from the receiving apparatus storage section, wherein the second data file is newly transmitted to the receiving apparatus, and
   the receiving apparatus further comprises history information transmitting means for transmitting, to the server apparatus, the deletion history information.

6. A receiving apparatus for receiving, from at least one server apparatus, a plurality of data files, the receiving apparatus comprising:
   a storage section for storing the plurality of data files; and
   file management means for restricting use of or deleting a data file from the plurality of data files which have already been stored in the storage section and which are specified by file specifying information received from the server apparatus, wherein the file specifying information is for specifying the data file being deleted or restricted from use in the receiving apparatus.

7. The receiving apparatus as set forth in claim 6, further comprising:
   history information transmitting means for transmitting, to the server apparatus, deletion history information specifying the data file deleted from the storage section.

8. A server apparatus for transmitting, to at least one receiving apparatus, a plurality of data files, the server apparatus comprising:
   at least a central processing unit for executing instructions of a control program, and a computer-readable storage medium including memory for storing the control program, the server apparatus further comprising:
   management information transmitting means for transmitting, to the receiving apparatus, management information specifying a second data file that is to be newly transmitted to the receiving apparatus, the receiving apparatus receiving the second data file,
   wherein the second data file is transmitted to the receiving apparatus after a first data file is deleted or restricted from use in the receiving apparatus, the second data file corresponding to the first data file which has already been stored in a storage section of the receiving apparatus.

9. The server apparatus as set forth in claim 8, further comprising:
   file selection means for selecting the second data file in accordance with deletion history information received from the receiving apparatus, the deletion history information specifying a first data file having been deleted from a storage section of the receiving apparatus, wherein the second data file is newly transmitted to the receiving apparatus.

10. A data management system, comprising:
    the server apparatus as set forth in claim 8; and
    the receiving apparatus for receiving, from the server apparatus, the plurality of data files, the receiving apparatus comprising:
    a storage section for storing the plurality of data files;
    file decision means for (i) receiving, from the server apparatus, management information specifying the second data file that is to be newly received from the server apparatus, and for (ii) deciding, in accordance with the management information, a first data file which has been already stored in the storage section, the first data file to be decided being deleted or restricted from use in the receiving apparatus when the second data file is stored in the storage section; and
    file management means for restricting use of the first data file decided by the file decision means, or for deleting the first data file from the storage section.

11. The data management system as set forth in claim 10, wherein the server apparatus further comprises file selection means for selecting the second data file in accordance with deletion history information received from the receiving apparatus, the deletion history information specifying the first data file deleted from the storage section, wherein the second data file is newly transmitted to the receiving apparatus, and
    the receiving apparatus further comprises history information transmitting means for transmitting, to the server apparatus, the deletion history information.

12. A receiving apparatus for receiving, from at least one server apparatus, a plurality of data files, the receiving apparatus comprising:
- a storage section for storing the plurality of data files;
- file decision means for (i) receiving, from the server apparatus, management information specifying a second data file that is to be newly received from the server apparatus, and for (ii) deciding, in accordance with the management information, a first data file which has been already stored in the storage section, the first data file to be decided being deleted or restricted from use in the receiving apparatus when the second data file is stored in the storage section; and
- file management means for restricting use of the first data file decided by the file decision means, or for deleting the first data file from the storage section,
- wherein the second data file, which corresponds to the first data file, is received from the server apparatus after the first data file is deleted or restricted from use by the file management means.

13. The receiving apparatus as set forth in claim 12, further comprising:
- history information transmitting means for transmitting, to the server apparatus, deletion history information specifying the first data file deleted from the storage section.

14. A control program for operating the server apparatus as set forth in claim 1 or claim 8,
- the control program causing a computer to function as each of the means.

15. A control program for operating the receiving apparatus as set forth in claim 6 or claim 12,
- the control program causing a computer to function as each of the means.

16. A computer-readable recording medium in which a control program as set forth in claim 14 is recorded.

17. A computer-readable recording medium in which a control program as set forth in claim 15 is recorded.

* * * * *

UNITED STATES PATENT AND TRADEMARK OFFICE
CERTIFICATE OF CORRECTION

| | | |
|---|---|---|
| PATENT NO. | : 7,979,391 B2 | Page 1 of 1 |
| APPLICATION NO. | : 11/666071 | |
| DATED | : July 12, 2011 | |
| INVENTOR(S) | : Shuichi Watanabe et al. | |

It is certified that error appears in the above-identified patent and that said Letters Patent is hereby corrected as shown below:

Title Page should read:

(86) PCT No.:  PCT/JP2006/302559

Signed and Sealed this
Eighth Day of November, 2011

David J. Kappos
*Director of the United States Patent and Trademark Office*